US012184818B2

(12) United States Patent  
Yokoyama

(10) Patent No.: US 12,184,818 B2  
(45) Date of Patent: Dec. 31, 2024

(54) IMAGE PROCESSING METHOD AND IMAGE PROCESSING DEVICE WHICH GENERATE REPRINT IMAGE DATA IN CORRESPONDENCE WITH PLURALITY OF IMAGE REGIONS OF RECORDED PRINT AND FURTHER BASED ON IMAGE DATA THEREOF, AS WELL AS PRINTING METHOD AND PRINT OUTPUT SYSTEM WHICH OUTPUT REPRINT IN WHICH OPTIMUM IMAGE IS RECORDED BASED ON REPRINT IMAGE DATA

(71) Applicant: FUJIFILM Corporation, Tokyo (JP)

(72) Inventor: Yukinori Yokoyama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/465,603

(22) Filed: Sep. 12, 2023

(65) Prior Publication Data

US 2024/0106940 A1    Mar. 28, 2024

(30) Foreign Application Priority Data

Sep. 28, 2022  (JP) ................................ 2022-155455

(51) Int. Cl.
*H04N 1/00* (2006.01)
*G06V 10/25* (2022.01)
(Continued)

(52) U.S. Cl.
CPC ......... *H04N 1/00167* (2013.01); *G06V 10/25* (2022.01); *G06V 30/147* (2022.01); *H04N 1/3873* (2013.01)

(58) Field of Classification Search
None
See application file for complete search history.

(56) References Cited

U.S. PATENT DOCUMENTS 6,278,528 B1   8/2001   Ohtsuka et al.
6,351,321 B1   2/2002   McIntyre et al.
(Continued)

FOREIGN PATENT DOCUMENTS

JP   2003-250047 A   9/2003
JP   2007-258869 A   10/2007
(Continued)

OTHER PUBLICATIONS

The extended European search report issued by the European Patent Office on Feb. 6, 2024, which corresponds to European Patent Application No. 23198263.8-1224 and is related to U.S. Appl. No. 18/465,603.

*Primary Examiner* — Henok Shiferaw
(74) *Attorney, Agent, or Firm* — Studebaker & Brackett PC

(57) ABSTRACT

Provided are an image processing method and an image processing device which can generate second print image data for recording an optimum image based on information from an image of a first print, and a printing method and a print output system which output a second print in which the optimum image is recorded.
An image processing method includes an acquisition step of acquiring first print image data from a first print having first and second regions, a determination step of determining image processing to be applied, based on information acquired from at least one region, and a generation step of generating second print image data for outputting a second print having a third region corresponding to the first region by performing the image processing on the first print image data.

20 Claims, 15 Drawing Sheets

(51) Int. Cl.
    *G06V 30/146*     (2022.01)
    *H04N 1/387*     (2006.01)

(56) References Cited

U.S. PATENT DOCUMENTS

| | | | | |
|---|---|---|---|---|
| 6,556,243 | B1* | 4/2003 | Dotsubo | H04N 1/2158 |
| | | | | 348/333.12 |
| 2002/0080251 | A1* | 6/2002 | Moriwaki | H04N 1/3871 |
| | | | | 348/333.03 |
| 2003/0161006 | A1 | 8/2003 | Kobayashi et al. | |
| 2005/0206747 | A1* | 9/2005 | Shirakawa | H04N 5/2621 |
| | | | | 348/E5.045 |
| 2007/0223047 | A1 | 9/2007 | Kameyama | |
| 2007/0236762 | A1 | 10/2007 | Tsuji | |
| 2009/0262219 | A1* | 10/2009 | Shirakawa | H04N 1/3871 |
| | | | | 348/E5.051 |
| 2010/0054587 | A1* | 3/2010 | Fukuoka | G06V 30/15 |
| | | | | 382/164 |
| 2010/0054591 | A1* | 3/2010 | Shiraishi | G06T 11/001 |
| | | | | 382/172 |
| 2010/0194927 | A1* | 8/2010 | Nose | H04N 23/634 |
| | | | | 348/240.2 |
| 2013/0039579 | A1* | 2/2013 | Ahn | G06V 40/161 |
| | | | | 382/190 |
| 2014/0285824 | A1* | 9/2014 | Ito | H04N 1/3871 |
| | | | | 358/1.2 |

FOREIGN PATENT DOCUMENTS

JP        2007-274017 A     10/2007
JP        2013-128230 A     6/2013

\* cited by examiner mini square

WIDE

FIG. 3D

| TYPE | ENTIRETY (mm) | PHOTOGRAPHIC PORTION (mm) |
|---|---|---|
| mini | 86x54 | 62x46 |
| SQUARE | 86x72 | 62x62 |
| WIDE | 86x108 | 62x99 |

FIG. 3E

| NAME | SIZE (mm) |
|---|---|
| HALF SIZE | 89x63 |
| TRUE SQUARE | 89x89 |
| DSC | 89x119 |
| L | 89x127 |
| KG (POST CARD SIZE) | 102x152 |
| HV | 89x158 |
| DSCW | 127x168 |
| 2L | 127x178 |
| A5 | 148x210 |
| P (PANORAMA SIZE) | 89x254 |
| SIX PIECES · 6P | 203x254 |
| A4 | 210x297 |
| A3 | 297x420 |
| SIX-PIECE WIDE · 6PW | 203x305 |
| FOUR PIECES · 4P | 254x305 |
| FOUR-PIECE WIDE · 4PW | 254x366 |
| E (EC) | 82.5x117 |
| KH | 102x178 |
| KPA | 102x254 |
| NAME CARD | 90x130 |
| EIGHT PIECES | 165x216 |
| HALF PIECE | 356x432 |
| WHOLE PAPER | 457x560 |

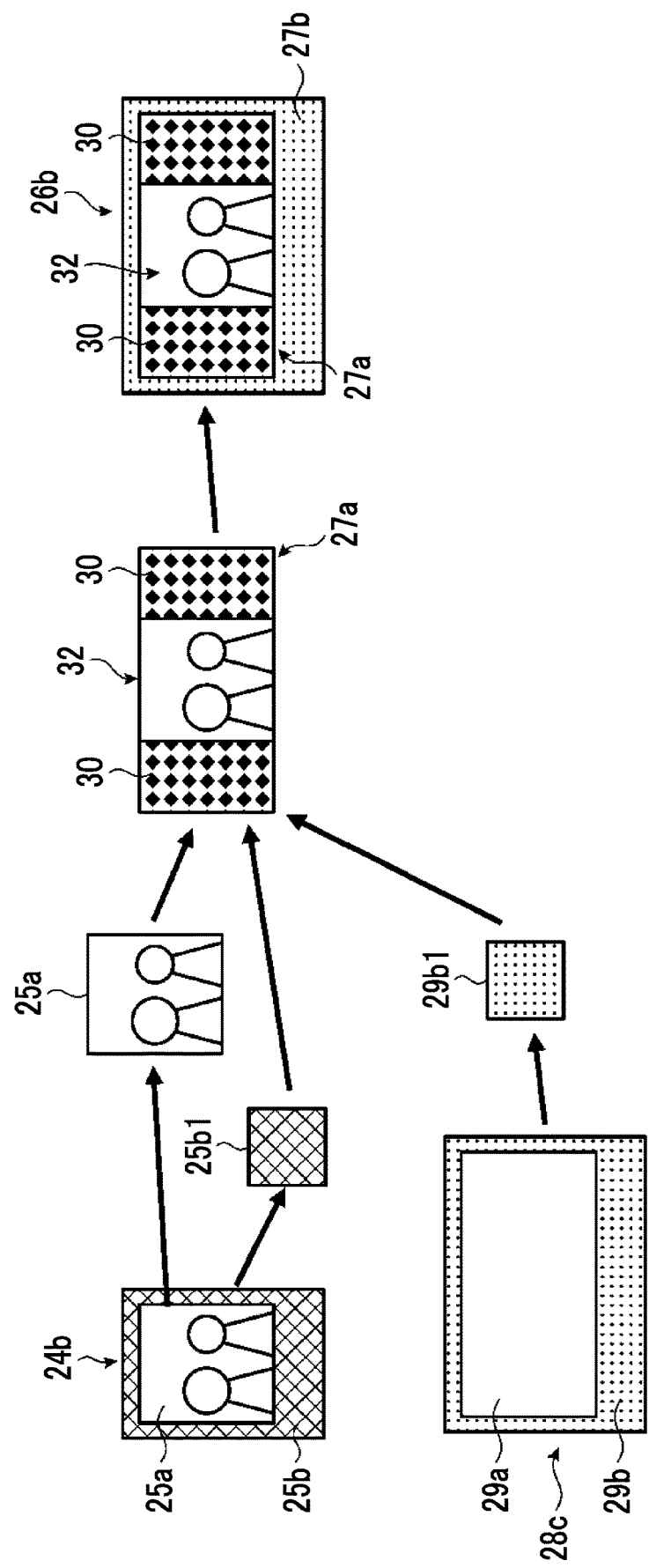

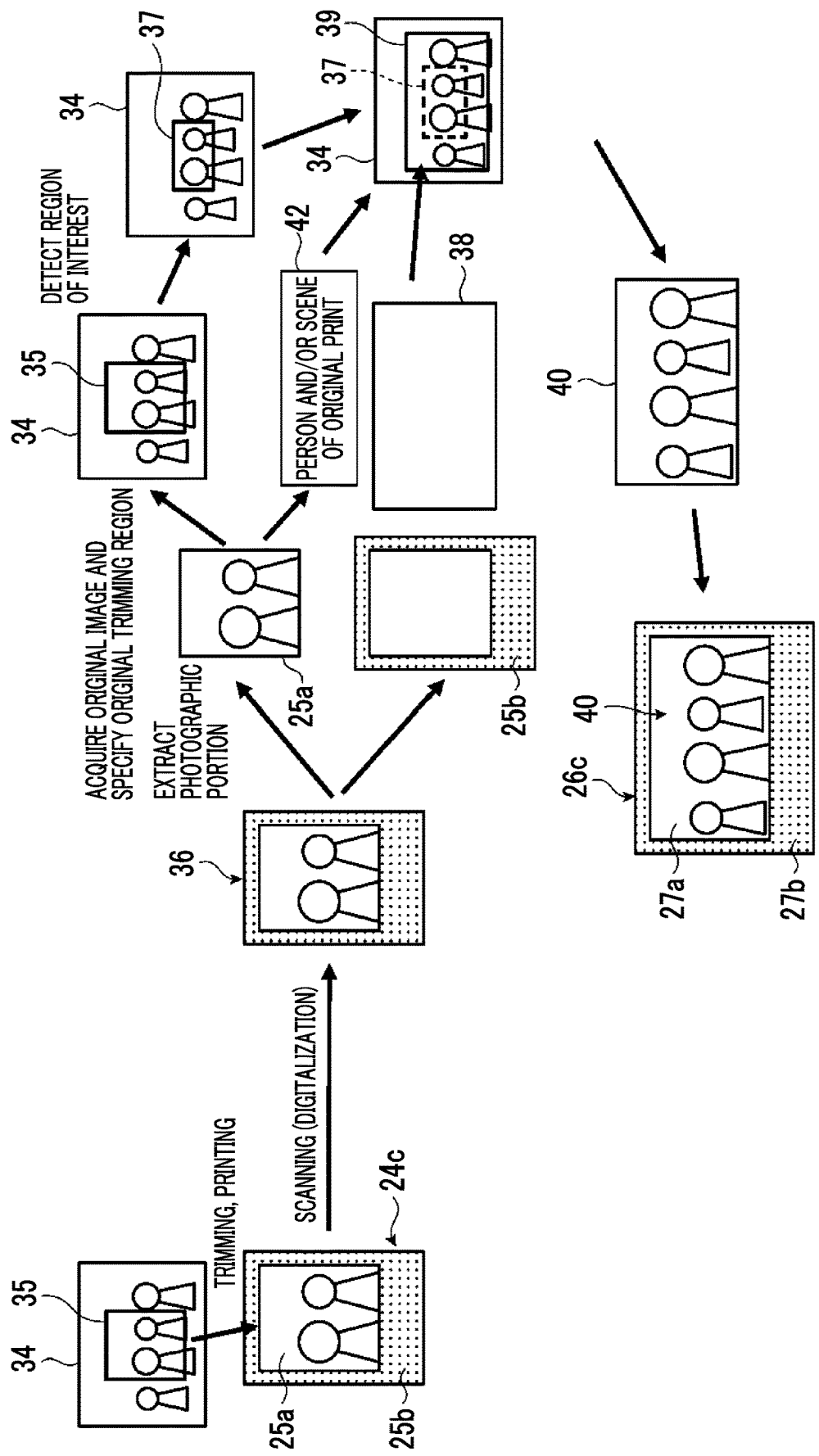

IMAGE PROCESSING METHOD AND IMAGE PROCESSING DEVICE WHICH GENERATE REPRINT IMAGE DATA IN CORRESPONDENCE WITH PLURALITY OF IMAGE REGIONS OF RECORDED PRINT AND FURTHER BASED ON IMAGE DATA THEREOF, AS WELL AS PRINTING METHOD AND PRINT OUTPUT SYSTEM WHICH OUTPUT REPRINT IN WHICH OPTIMUM IMAGE IS RECORDED BASED ON REPRINT IMAGE DATA

CROSS-REFERENCE TO RELATED APPLICATIONS

The present application claims priority under 35 U.S.C. § 119 to Japanese Patent Application No. 2022-155455, filed on Sep. 28, 2022. The above application is hereby expressly incorporated by reference, in its entirety, into the present application.

BACKGROUND OF THE INVENTION

1. Field of the Invention

The present invention relates to an image processing method, an image processing device, a printing method, and a print output system.

2. Description of the Related Art

By using image data of images captured by various imaging units, output media of various medium sizes are subjected to various types of image processing to output various images. For example, there is a case in which a plurality of regions of the image data of a print image are set as target regions for the image processing to perform the image processing according to each region (see JP2003-250047A). In addition, there is a case in which the image is trimmed based on a zoom magnification of the captured image, a degree of interest of a subject, a detected position of the subject, and/or a size (see JP2007-258869A and JP2007-274017A).

SUMMARY OF THE INVENTION

Incidentally, it is required to generate image data of an image of a second print, for example, a reprint from image data of an image of a first print, for example, an original print, and to output the image of the reprint as an image suitable for observation. For example, in a case in which the image data and/or information on at least one region of a frame region of the original print, an entire photographic (printing) region, or a partial region can be used, it is possible to output the image of the reprint as the image suitable for the observation.

The present invention solves the problems in the related art described above, and is to provide an image processing method and an image processing device which can generate new second print image data for recording an optimum image on a new recording medium based on information on a plurality of regions, such as the photographic region and/or the frame region, obtained from a recorded image of the first print, and further the image data thereof as necessary.

In addition, the present invention is to provide a printing method and a print output system which can output the second print in which the optimum image is recorded on the recording medium based on the new second print image data generated in this way.

In order to achieve the object described above, an aspect of the present invention relates to an image processing method comprising an acquisition step of acquiring first print image data from a first print having a first region and a second region, a determination step of determining image processing to be applied, based on information acquired from at least one region of the first region or the second region, and a generation step of generating second print image data for outputting a second print having a third region corresponding to the first region by performing the image processing on the acquired first print image data.

In addition, in order to achieve the object described above, another aspect of the present invention relates to a printing method comprising outputting, based on the second print image data generated by the image processing method according to the aspect described above, the second print in which an image for the second print is recorded on a recording medium of the second print.

Here, the second print may have a fourth region corresponding to the second region.

In addition, the acquisition step may include a detection step of detecting first region image data of the first region of the first print and second region image data of the second region of the first print, in the determination step, different types of image processing may be respectively determined for the first region image data and the second region image data, which are detected, and in the generation step, third region image data of the third region and fourth region image data of the fourth region may be generated based on the first region image data and the second region image data, and may be combined as the second print image data.

In addition, in a case in which a paper size of the first print and a recording medium size of the second print are different from each other, in the generation step, the fourth region image data of the second print may be generated by performing, on the second region image data of the first print, image processing for supplementing or cropping a video without resizing the second region of the first print, the third region image data of the second print may be generated by performing, on the first region image data of the first print, image processing for resizing the first region of the first print based on information on a size of the fourth region of the second print, and the second print image data may be generated by combining the fourth region image data of the second print and the third region image data of the second print.

In addition, the first region and the third region may be photographic portions of the first print and the second print, respectively, and the second region and the fourth region may be frame portions of the first print and the second print, respectively.

In addition, in the generation step, the second print image data may be generated by recognizing a pattern and a handwritten text of the frame portion of the first print, and applying image processing according to a recognition result to the first print image data of the photographic portion of the first print.

In addition, in the generation step, the second print image data may be generated by applying image processing according to a combination of a pattern of the frame portion of the first print and a pattern of the frame portion of a recording medium used in the second print to the first print image data of the photographic portion of the first print.

In addition, the frame portion of the second print may be different from the frame portion of the first print.

In addition, in the generation step, as a cropping region of an image for the second print, information on a new cropping region for generating the image for the second print may be generated based on a first image corresponding to the photographic portion of the first print, cropping region information for the first image, and recording medium size information of the second print.

In addition, the information acquired from the at least one region may include a result of the image processing on the first print image data in the at least one region.

In order to achieve the object described above, still another aspect of the present invention relates to an image processing device comprising a smart device that acquires first print image data from a first print having a first region and a second region, a processor that determines image processing to be applied, based on information acquired from at least one region of the first region or the second region, and performs the determined image processing on the acquired first print image data to generate second print image data for outputting a second print having a third region corresponding to the first region, and a network that transmits the first print image data acquired in the smart device to the processor.

In addition, in order to achieve the object described above, still another aspect of the present invention relates to a print output system comprising the image processing device according to the aspect described above, and a printer that outputs, based on the second print image data generated by the image processing device, the second print in which an image for the second print is recorded on a recording medium of the second print.

Here, the smart device may detect first region image data of the first region of the first print and second region image data of the second region of the first print, and the processor may respectively determine different types of image processing for the first region image data and the second region image data, which are detected, may generate third region image data of the third region and fourth region image data of a fourth region corresponding to the second region based on the first region image data and the second region image data, and may combine the third region image data and the fourth region image data as the second print image data.

According to the present invention, and it is possible to provide the image processing method and the image processing device which can generate the new second print image data for recording the optimum image on the new recording medium based on the information on the plurality of regions, such as the photographic region and/or the frame region, obtained from the recorded image of the first print, and further the image data thereof as necessary.

In addition, according to the present invention, it is possible to provide the printing method and the print output system which can output the second print in which the optimum image is recorded on the recording medium based on the new second print image data generated in this way.

BRIEF DESCRIPTION OF THE DRAWINGS

FIG. 3D is a table showing size information of the recording media shown in FIGS. 3A to 3C.

FIG. 3E is a table showing size information of a color paper used as the recording medium for recording the image of the second print.

FIG. 6 is a diagram for describing a third embodiment of the image processing method and the printing method according to the embodiment of the present invention.

FIG. 7A is a flowchart of the fourth embodiment of the image processing method and the printing method shown in FIG. 7.

FIG. 8 is a diagram for describing a fifth embodiment of the image processing method and the printing method according to the embodiment of the present invention.

DESCRIPTION OF THE PREFERRED EMBODIMENTS

Figure 1:
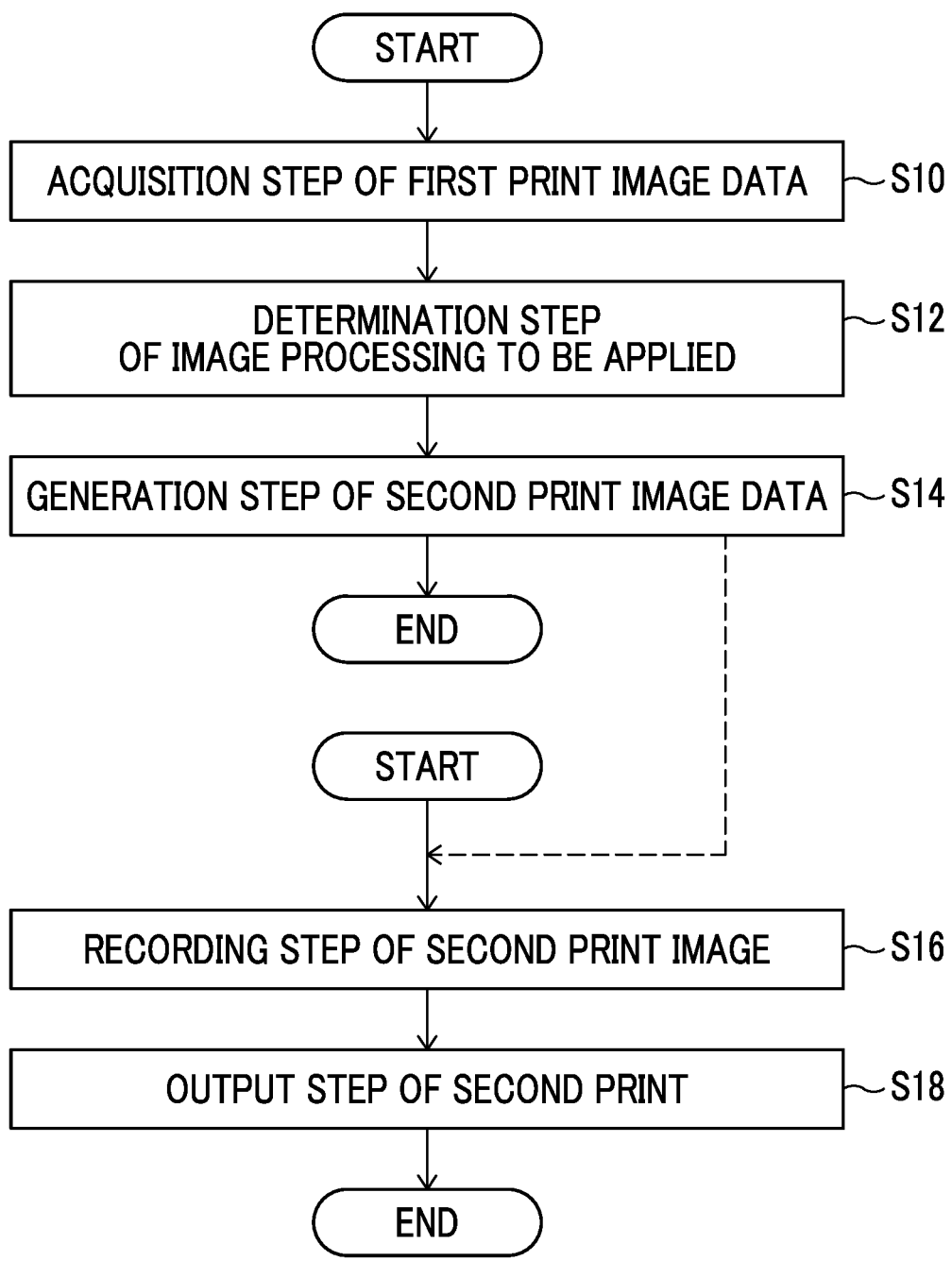
FIG. 1 is a flowchart of an image processing method and a printing method according to an embodiment of the present invention.

Hereinafter, a specific embodiment of the present invention will be described. However, the embodiments described below are merely examples for ease of understanding of the present invention, and are not intended to limit the present invention. That is, the present invention may be changed or improved from the embodiments described below without departing from the spirit of the present invention. Moreover, the present invention includes its equivalents.

In addition, in the present specification, the term "image" means an image of an entire region of an original first print (also referred to as an original print) and a new second print (also referred to as a reprint) different from the first print. Further, the term "image" means, in addition to these images of the entire region, photographic images recorded on a major first region of the first print and a third region of the second print (hereinafter, these two regions are also referred to as a photographic portion, a photographic region, a printing region). Further, the term "image" is not limited to these, but means a pattern image or a figure recorded on a second region (hereinafter, also referred to as a frame portion and a frame region) that surrounds the periphery of the first region of the first print, and an image of handwritten text described by a user or the like. In addition, in the present invention, a fourth region may be provided that surrounds the periphery of the third region of the second print, and in this case, the term "image" also means images of a pattern, a figure, a text, and the like recorded on the fourth region (hereinafter, also referred to as a frame portion and a frame region).

In addition, in the present specification, the term "image" also means an image that can be displayed by image data to be described below, in addition to the images recorded and displayed in the first print and the second print.

In addition, in the present specification, the term "image data" means data (digital image data) indicating a gradation of each pixel, and means the first print image data obtained by imaging or scanning the first print, the second print image data for outputting the second print, and digital image data of images of the first and second regions of the first print and the third and fourth regions of the second print.

Examples of a file format of the image data include joint photographic experts group (JPEG), tagged image file format (Tiff), graphics interchange format (GIF), Microsoft windows bitmap image (BMP), portable network graphics (PNG), and high efficiency image file format (HEIF).

Also, in the present specification, the concept of "system" includes a combination of a plurality of devices that are distributed and present independently of each other and exert a specific function in cooperation (coordination) with each other.

In addition, in the present invention, the term "user" means a subject that uses an image processing method and a printing method according to the embodiment of the present invention, and specifically, for example, a subject that uses the second print image data generated by the image processing method according to the embodiment of the present invention, and the second print output by the printing method according to the embodiment of the present invention. In addition, in the present specification, the term "subject" means a main subject that performs specific behavior, can include an individual, a group, a corporation, such as a company, an organization, and the like, and can also further include a computer and a device that constitute artificial intelligence (AI). The artificial intelligence realizes intellectual functions, such as reasoning, prediction, and determination, by using a hardware resource and a software resource. An algorithm of the artificial intelligence is optional, and examples thereof include an expert system, a case-based reasoning (CBR), a Bayesian network, or an inclusion architecture.

Embodiments of Present Invention

Hereinafter, configuration examples of an image processing method and a printing method according to an embodiment of the present invention, and an image processing device and a print output system that execute the image processing method and the printing method will be described with reference to FIGS. 1, 2, and 2A.

As shown in FIG. 1, the image processing method according to the embodiment of the present invention includes an acquisition step S10 of first print image data, a determination step S12 of image processing to be applied, and a generation step S14 of second print image data.

In addition, the printing method according to the embodiment of the present invention includes a recording step S16 of a second print image using the second print image data generated in the generation step S14 of the second print image data in the image processing method according to the embodiment of the present invention, and an output step S18 of a second print.

Figure 2:
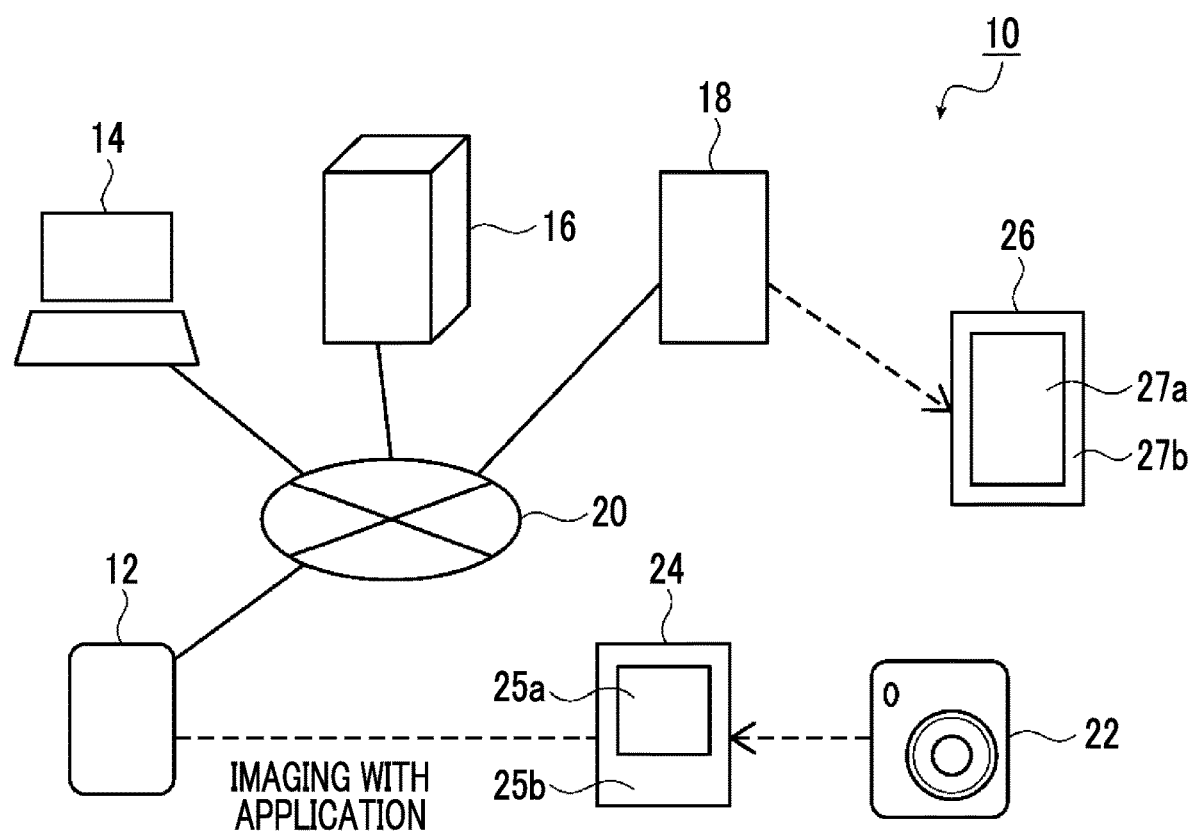
FIG. 2 is a diagram showing a configuration example of a print output system that executes the image processing method and the printing method shown in FIG. 1.

As shown in FIG. 2, a print output system 10 that executes the image processing method and the printing method according to the embodiment of the present invention shown in FIG. 1 comprises a smart device 12, a computer 14, a server 16, a photographic printer 18, and a network 20.

Figure 2A:
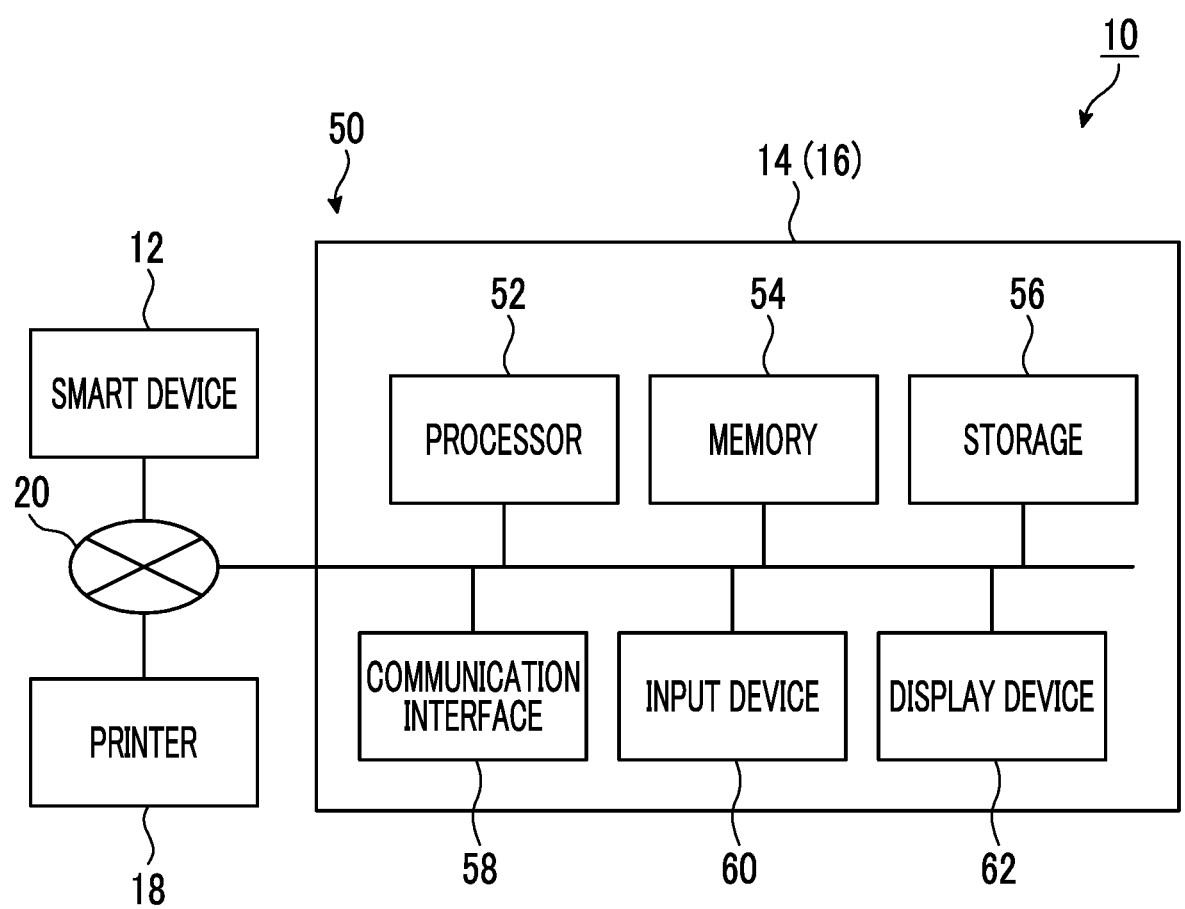
FIG. 2A is a block diagram of the print output system comprising an image processing device according to the embodiment of the present invention.

Further, as shown in FIG. 2A, the print output system 10 comprises an image processing device 50 and the photographic printer 18 shown in FIG. 2. Here, the image processing device 50 comprises the smart device 12 shown in FIG. 2, a processor 52 configured by using the computer 14 and/or the server 16 shown in FIG. 2, a memory 54, a storage 56, and a communication interface 58.

The acquisition step S10 of the image processing method according to the embodiment of the present invention is, for example, a step of imaging a first print 24, in which a subject is imaged and output by a printer-equipped analog camera 22, by using the smart device 12 to acquire first print image data (digital image data).

In the present invention, in the example shown in FIG. 2, the first print 24 is a rectangular print having a first region 25a and a second region 25b imaged and output by the printer-equipped analog camera 22, but the present invention is not limited to this, and any print may be used, and the print may be output by any method.

The first print 24 need only have the first region 25a and the second region 25b, and for example, may be a print in which a photographic image is recorded on a first region 29a of rectangular recording media (hereinafter, also referred to as print paper) 28 having different sizes (for example, instant films 28a, 28b, and 28c) shown in FIGS. 3A, 3B, and 3C, respectively. It should be noted that sizes and aspect ratios of the first print 24 and thus the print paper 28 are not limited to these three sizes and aspect ratios, and may be various sizes and aspect ratios, and a shape of the first print 24 is also not limited to the rectangular shape, and may be various shapes. It should be noted that the first region 25a and the second region 25b of the first print 24, and thus the first region 29a and a second region 29b of the print paper 28 may also have various shapes, sizes, and aspect ratios.

In addition, the first print 24 may be, for example, a print in which a photographic image of a photographic film is printed on the first region 29a of the recording medium 28 by a photographic printer, may be a print captured and output by a printer-equipped digital camera, or may be a print output from any printer.

In the present invention, the first region 25a and the second region 25b of the first print 24 mean regions in which different images are recorded, respectively, but an image in one region is the photographic image, and an image in the other region is an image of a frame that surrounds the periphery of the photographic image. It should be noted that the image of the frame is usually a pattern or the like that forms the frame, but also includes a plain image in which nothing is recorded.

It should be noted that a third region 27a and a fourth region 27b of a second print 26, which will be described below, also correspond to the first region 25a and the second region 25b of the first print 24, respectively.

Hereinafter, the description will be made in which the first region 25a and the corresponding third region 27a are photographic portions in which the photographic image is to be recorded or is recorded, and the second region 25b and the corresponding fourth region 27b are frame portions in which an image, such as a pattern of the frame, is recorded.

Then, in the example shown in FIG. 2, the smart device 12 captures an image of the entire region of the first print 24 to acquire the first print image data. Here, examples of the smart device 12 include an information device terminal provided with an imaging function, such as a smartphone.

In the present invention, the first print image data is not limited to the first print data acquired by the smart device 12, and any method may be used for the acquisition as long as the first print image data can be acquired.

For example, the first print image data may be acquired by capturing the image of the entire region of the first print 24 by using a digital camera, or may be acquired by scanning the image of the entire region of the first print 24 with a scanner or copying device.

It should be noted that the acquisition step S10 may comprise a detection step of detecting first region image data of the first region 25a of the first print 24 and second region image data of the second region 25b, respectively, and may acquire the first print image data by combining the first region image data and the second region image data.

As shown in FIGS. 2 and 2A, the information device terminal provided with the imaging function, such as the smart device 12, can be connected to the computer (personal computer; PC) 14 and the server 16 via the network 20. The first print image data obtained in this way is transmitted from the smart device 12 to the computer 14 and/or the server 16 constituting the image processing device 50 via the network 20, is input to the processor 52 via the communication interface 58, and is stored in the memory 54 or storage 56 as necessary.

Here, the computer 14 and/or the server 16 used in the embodiment of the present invention may be any computer and/or server as long as the determination step S12 and the generation step S14, which will be described below, can be executed. For example, as shown in FIG. 2A, the computer 14 and/or the server 16 need only include the processor 52, the memory 54, the storage (storage device) 56, the communication interface 58, and the like, and may be an integrated server computer comprising these components. Further, the computer 14 may include an input device 60, such as a keyboard, a mouse, and a scanner, and an output device, such as a display (display device) 62 and a printer.

It should be noted that the processor 52 is configured by using, for example, a central processing unit (CPU), a graphics processing unit (GPU), a digital signal processor (DSP), or a tensor processing unit (TPU). The memory 54 is configured by using, for example, a semiconductor memory, such as a read only memory (ROM) and a random access memory (RAM). The storage (storage device) 56 is configured by using a hard disk, a magneto-optical disk drive, or the like. The communication interface 58 is configured by using, for example, a network interface card or a communication interface board.

Next, the determination step S12 is executed in the processor 52 of the computer 14 and/or the server 16, and is a step of determining image processing to be applied to the first print image data for generating the second print image data based on information acquired from at least one region of the first region 25a or the second region 25b of the first print 24.

In the determination step S12, examples of the information acquired from the first region 25a of the first print 24 include the size and the aspect ratio of the first region 25a, the presence or absence of trimming of the photographic image of the photographic portion 25a, the size and the aspect ratio of the trimming region, a recognition result of the subject, for example, a person in the photographic image of the photographic portion 25a, and a recognition result of a scene of the subject. These pieces of information may be stored in the memory 54, or may be stored in the storage 56.

It should be noted that these pieces of information may be acquired by analyzing the image data of the first region 25a of the first print 24 acquired in the acquisition step S10 in the processor 52, or may be acquired in advance by a user from the photographic image of the first region 25a. These pieces of information may be stored in the memory 54, or may be stored in the storage 56.

Next, examples of the information acquired from the second region (frame portion) 25b of the first print 24 include the size of the frame portion 25b, the pattern (figure pattern) of the frame portion 25b, such as a color, a drawing pattern, and a design, and a handwritten text, such as "birthday" representing a subject matter of the first print 24 described in the frame portion.

It should be noted that these pieces of information may be acquired by analyzing the image data of the second region 25b of the first print 24 acquired in the acquisition step S10 in the processor 52, or may be acquired in advance by a user from the image of the frame of the second region 25b. It should be noted that, even in a case in which the handwritten text is described, in addition to the second region 25b of the first print 24, in the first region 25a or both regions, the information on the handwritten text may be acquired from the first region 25a or both regions in addition to the second region 25b.

In addition, examples of the image processing determined in the determination step S12 include filter processing to be performed on the first print image data or first region image data, and/or the second region image data for providing the figure suitable for the third region 27a and/or the fourth region 27b of the second print 26 according to the pattern and/or the handwritten text of the frame portion 25b. For example, in the determination step, different types of image processing may be respectively determined as the image processing applied to the first region image data and the second region image data detected in the detection step.

In addition, examples of other image processing include image processing for determining the pattern according to a combination of the pattern of the frame portion 25b of the first print 24 and the pattern of the fourth region (frame portion) 27b of the second print 26 to forming the determined pattern in the periphery of the third region (photographic portion) 27a of the second print 26.

In addition, examples of other image processing include image processing for resizing the first region image data of the photographic portion 25a of the first print 24 and the second region image data of the frame portion 25b, which are separately acquired, respectively, and combining the two first region image data.

In addition, examples of other image processing include image processing for determining the trimming region for the raw photographic image to obtain the photographic image of the third region (photographic portion) 27a of the second print 26 with reference to the trimming region of the raw photographic image performed to obtain the photographic image of the first print 24 in a case in which the photographic image of the first region 25a of the first print 24 is the raw photographic image of the original raw print.

In addition, examples thereof also include image processing for recognizing the subject, the person, and/or the scene shown in the raw photographic image described above, and determining the trimming region on the raw photographic image to obtain the photographic image of the second print 26 based on the recognition result.

It is preferable that a plurality of types of image processing described above are stored in the memory 54 or the storage 56 in advance.

Next, the generation step S14 is executed in the processor 52 of the computer 14 and/or the server 16, and is a step of generating the second print image data for outputting the second print 26 having the third region (photographic portion) 27*a* corresponding to the first region (photographic portion) 25*a* of the first print 24 by performing the above-described image processing determined in the determination step S12 on the first print image data acquired in the acquisition step S10.

In this way, in the image processing method according to the embodiment of the present invention, various types of image processing described above can be performed to generate various new second print image data for recording the optimum image on the new recording medium 28. It is preferable that the second print image data generated in this way in the generation step S14 is stored in the memory 54 or the storage 56 as necessary.

The second print image data generated in this way is transmitted from the processor 52 of the computer 14 and/or the server 16 of the image processing device 50 to the printer 18 through the communication interface 58.

Hereinafter, the printing method according to the embodiment of the present invention will be described.

The recording step S16 of the printing method according to the embodiment of the present invention is a step of recording an image for the second print on the recording medium 28 for the second print in the printer 18 based on the second print image data transmitted from the processor 52 of the computer 14 and/or the server 16 to the printer 18 through the communication interface 58 via the network 20. It should be noted that the transmitted second print image data is generated in the generation step S14 of the second print image data in the image processing method according to the embodiment of the present invention described above in the image processing device 50, that is, the processor 52 of the computer 14 and/or the server 16.

Here, the recording medium 28 for the second print can be used in the printer 18, and any recording medium may be used as long as the image for the second print can be recorded. Examples thereof include reprint paper, such as an instant film, an ink jet paper, and a photographic printing paper, such as a monochrome paper and a color paper. It should be noted that, as the recording medium 28 for the second print, the recording medium similar to the recording medium (print paper) 28 for the first print 24 can be used, but the shapes, the sizes, and the aspect ratios thereof may be similar to or different from each other.

Figure 3A:
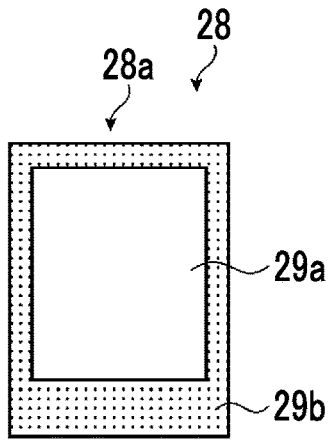
FIG. 3A is a diagram showing an example of a recording medium on which an image of a second print is recorded.
Figure 3B:
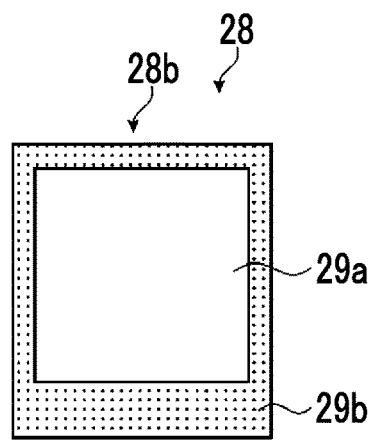
FIG. 3B is a diagram showing an example of a recording medium having a size different from a size of the recording medium shown in FIG. 3A.
Figure 3C:
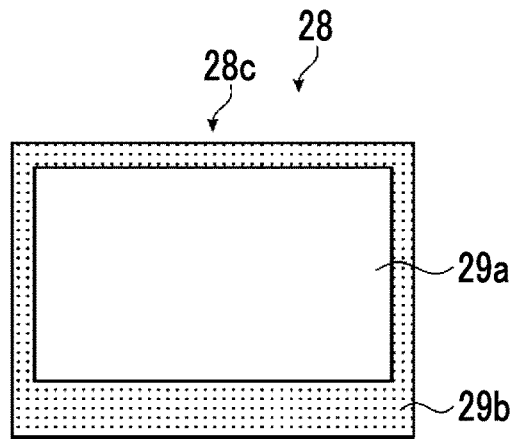
FIG. 3C is a diagram showing an example of a recording medium having a size different from sizes of the recording media shown in FIGS. 3A and 3B.

Here, as the recording medium (print paper) 28 for the second print, similar to the recording media (instant film) 28*a* (instax mini film; manufactured by FUJIFILM CORPORATION), 28*b* (instax SQUARE film; manufactured by FUJIFILM CORPORATION), and 28*c* (instax WIDE film; manufactured by FUJIFILM CORPORATION) shown in FIGS. 3A, 3B, and 3C, a recording medium may be used, which has a pattern or the like in advance in the frame portion 29*b* serving as the frame portion 27*b* of the second print 26 and on which only the photographic image of the image for the second print is recorded on the photographic portion 29*a* serving as the photographic portion 27*a* of the second print 26. Further, as the recording medium 28 for the second print, a recording medium may be used on which the photographic image of the image for the second print can be recorded on the photographic portion 29*a* and the frame image of the image for the second print can be superimposed and recorded on the frame portion 29*b* having the pattern or the like. Further, the recording medium 28 for the second print may be a recording medium on which nothing is recorded on the frame portion 29*b* and the image can be recorded on the entirety thereof. In this case, the second print image data may include third region image data serving as the photographic portion 27*a* of the second print 26 and fourth region image data serving as the frame portion 27*b* of the second print 26, and the photographic portion 27*a* and the frame portion 27*b* of the second print 26 may be recorded by recording the image for the second print on such a recording medium 28 based on the second print image data.

It should be noted that the size and the aspect ratio of the second print 26 are not limited to these three sizes and aspect ratios, similar to the first print 24, and may be various sizes and aspect ratios, and the shape of the second print 26 is also not limited to the rectangular shape, and may be various shapes, similar to the first print 24. It should be noted that, as the recording medium 28 for the second print, the recording medium similar to the recording medium (print paper) 28 for the first print 24 can be used, but the shapes, the sizes, and the aspect ratios thereof may be similar to or different from each other. Of course, the shape, the size, and the aspect ratio of the photographic portion 27*a* of the second print 26 may be the same as or different from those of the photographic portion 25*a* of the first print 24.

For example, for the paper shapes, the paper sizes, the aspect ratios, and the like of the instant films 28*a*, 28*b*, and 28*c*, which are the print paper 28, the size information and the like shown in FIGS. 3A, 3B, and 3C, and FIG. 3D can be referred to. In addition, examples of the pattern and/or the figure of the frame portion 29*b* of the instant films 28*a*, 28*b*, and 28*c*, which are the print paper 28, include white, single color and/or a mixed color other than white, such as black, red, blue, and pink, a plurality of colors, gradation of a plurality of colors, a pattern, such as dot, check, stripe, stained glass, confetti, star, or Japanese style pattern, a figure with a natural object and/or a living thing as a motif, a figure with various color schemes and/or designs, such as art expression and/or character design.

In addition, for the paper shape, the paper size, the aspect ratio, and the like of the color paper, which is the print paper 28, a large number of the size information shown in FIG. 3E can be referred to.

Then, the output step S18 is a step of outputting the second print 26 in which the image for the second print is recorded on the recording medium 28 by the printer 18 in the recording step S16.

The second print 26 is a print on which the optimum image for the subject, the person, and/or the scene is recorded on the photographic portion 27*a* and/or the frame portion 27*b*.

The image processing method and the printing method according to the embodiment of the present invention, and the image processing device and the print output system according to the embodiment of the present invention are basically configured as described above.

Hereinafter, specific embodiments of the image processing method and the printing method according to the embodiment of the present invention will be described.

About First Embodiment

First, a first embodiment of the image processing method and the printing method according to the embodiment of the present invention will be described in detail with reference to FIGS. 1, 4, and 4A.

Figure 4:
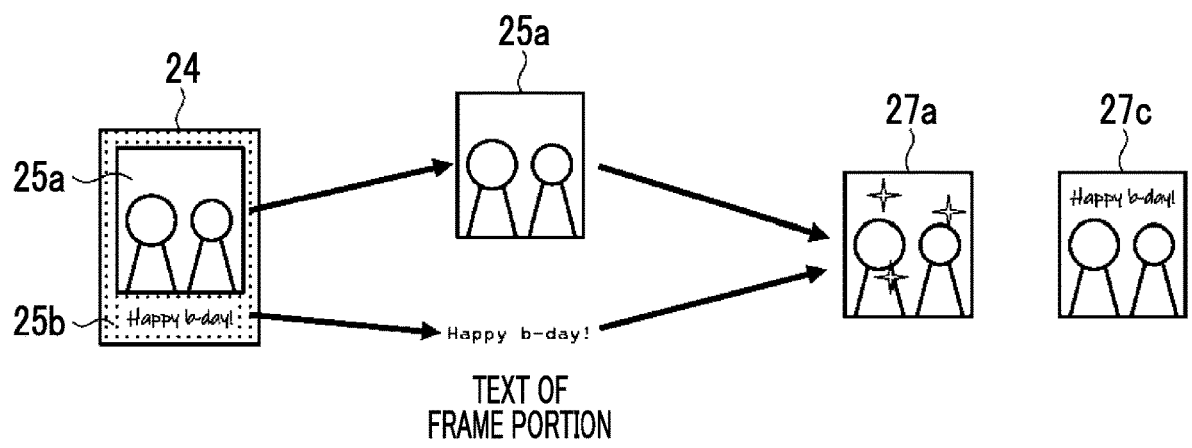
FIG. 4 is a diagram for describing a first embodiment of the image processing method and the printing method according to the embodiment of the present invention.

As shown on the left side of FIG. 4, the original (first) print 24 is prepared in which the photographic image of two persons is recorded on the photographic portion 25a, there is the pattern in the entire region of the frame portion 25b that surrounds the periphery of the photographic portion 25a, and the handwritten text "Happy b-day", which is a simplification of "Happy birthday", is described in the lower region.

In this case, in the acquisition step S10 of the image processing method according to the embodiment of the present invention shown in FIG. 1, the original (first) print image data of the entire original print 24 is acquired. That is, as in step S10a shown in FIG. 4A, the original print image data of the original print 24 is acquired in which the person is described in the photographic portion 25a, the pattern is described in the frame portion 25b, and the handwritten text is described.

Figure 4A:
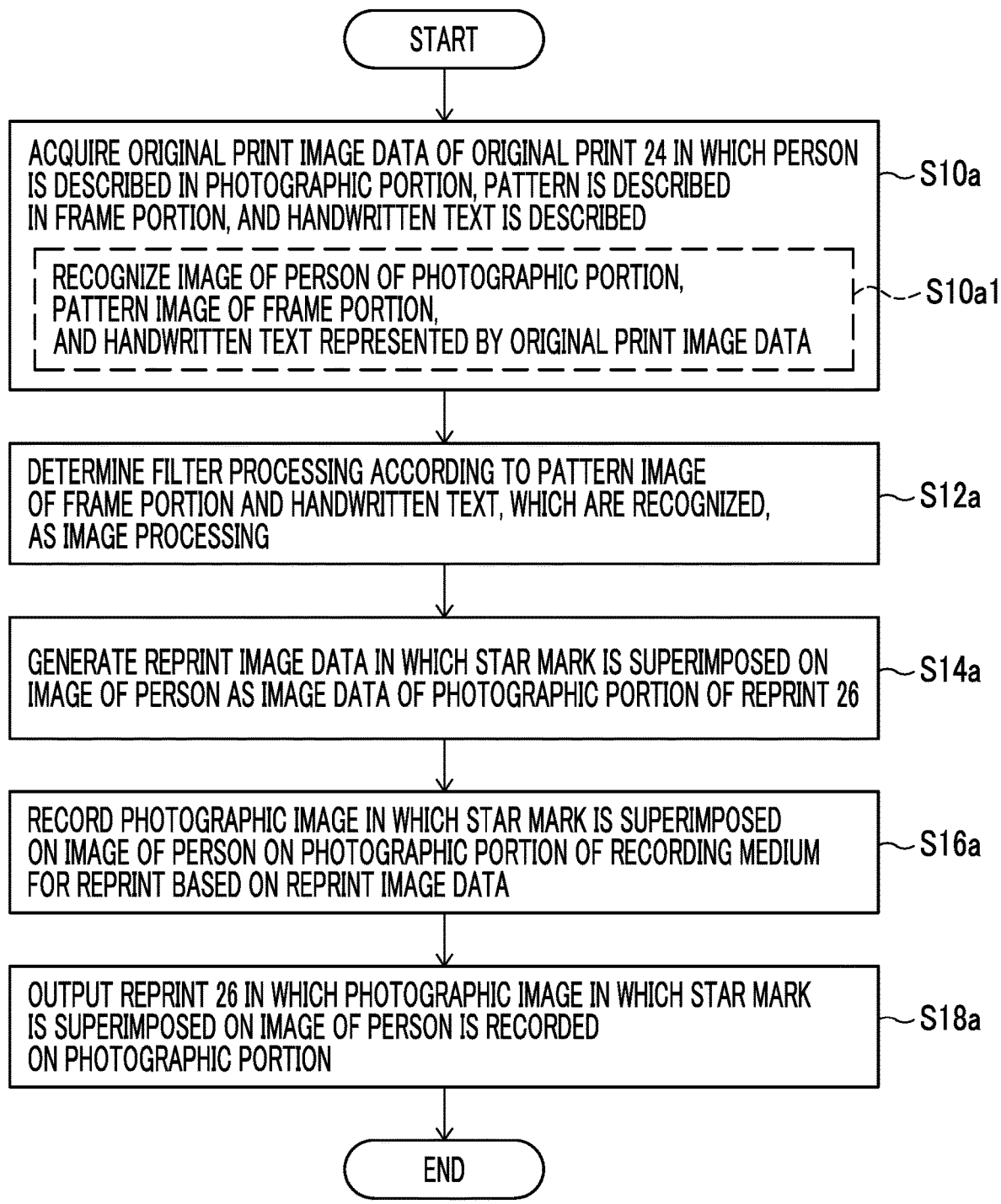
FIG. 4A is a flowchart of the first embodiment of the image processing method and the printing method shown in FIG. 4.

Here, as shown on the middle side of FIG. 4, the image of the photographic portion 25a of the scan image (image of the entire scanned original print 24), the pattern image of the frame portion 25b, and the handwritten text, which are represented by the acquired original print image data, can be recognized (see step S10a1 of FIG. 4A).

Then, in the determination step S12, the pattern of the frame portion 25b and the handwritten text of the scan image represented by the original print image data acquired in the acquisition step S10 are recognized, and filter processing according to the pattern of the frame portion 25b and the handwritten text, which are recognized, is determined as the image processing to be applied to the image data (step S12a of FIG. 4A). It should be noted that this recognition may be performed by the processor 52 of the computer 14 and/or the server 16 from the image data of the frame portion 25b of the acquired original print image data, or may be recognized by the user and input to the computer 14 and/or the server 16.

Here, examples of the filter processing include, as shown on the right side of FIG. 4, processing of superimposing a star mark corresponding to the birthday indicated by the handwritten text on the image of the photographic portion 25a.

Then, in the generation step S14, as the image data of the photographic portion 27a of the reprint (second print) 26, as shown on the right side of FIG. 4, reprint image data of the image of the reprint 26 in which the star mark is superimposed on the photographic image of two persons is generated. That is, as in step S14a of FIG. 4A, as the image data of the photographic portion 27a of the reprint 26, the reprint image data is generated in which the star mark is superimposed on the image of the person.

Here, although the image of the frame portion 27b is not shown on the right side of FIG. 4, the frame portion 27b may be the same pattern image as the frame portion 25b of the original print 24, or may be an image in which a similar star mark is superimposed on this pattern.

In this way, the image processing method according to the embodiment of the present invention is terminated.

Thereafter, the recording step S16 and the output step S18 of the printing method according to the embodiment of the present invention shown in FIG. 1 are executed based on the reprint image data generated in the image processing method according to the embodiment of the present invention, and the reprint (second print) 26 having the photographic portion 27a in which the photographic image in which the star mark is superimposed on the photographic image of two persons shown on the right side of FIG. 4 is recorded is output. That is, as in step S16a of FIG. 4A, the photographic image in which the star mark is superimposed on the image of the person is recorded on the photographic portion 27a of the recording medium 28 for the reprint based on the reprint image data. Subsequently, as in step S18a, the reprint 26 is output in which the photographic image in which the star mark is superimposed on the image of the person is recorded on the photographic portion 27a.

It should be noted that, in the first embodiment, instead of the photographic image with the star mark of the photographic portion 27a of the reprint 26, the photographic image may be used as the photographic portion 27c of the reprint 26, and the photographic image in which the same text as the handwritten text is recorded on a predetermined style above the image of two persons may be used as the photographic portion 27c of the reprint 26.

In the first embodiment, in a case of reprinting to produce the reprint 26, the information of the handwritten text of the frame portion 25b of the original print 24 can be used, and the images of the photographic portions 27a and 27c of the reprint 26 can be made to the optimum image having an optimum atmosphere for the information on the image of the photographic portion 25a of the original print 24 and the handwritten text of the frame portion 25b. That is, as shown in FIG. 5, it is possible to recognize that "Happy b-day" is described in the frame portion, and it is possible to also apply a fun atmosphere filter to the image in the photographic portion 27a of the reprint 26.

About Second Embodiment

First, a second embodiment of the image processing method and the printing method according to the embodiment of the present invention will be described in detail with reference to FIGS. 1, 5, and 5A.

Figure 5:
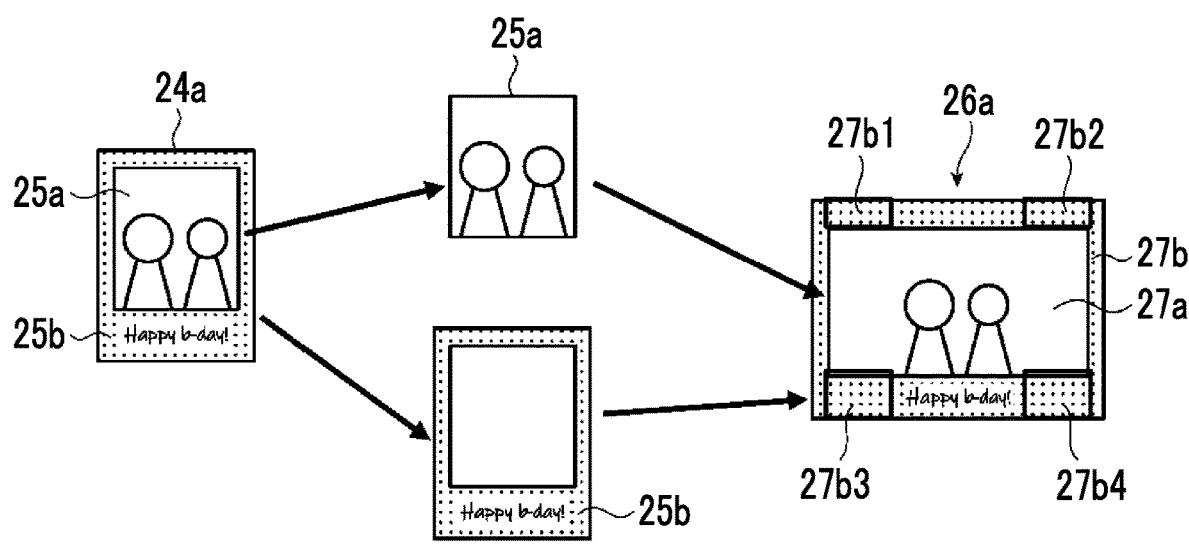
FIG. 5 is a diagram for describing a second embodiment of the image processing method and the printing method according to the embodiment of the present invention.
Figure 5A:
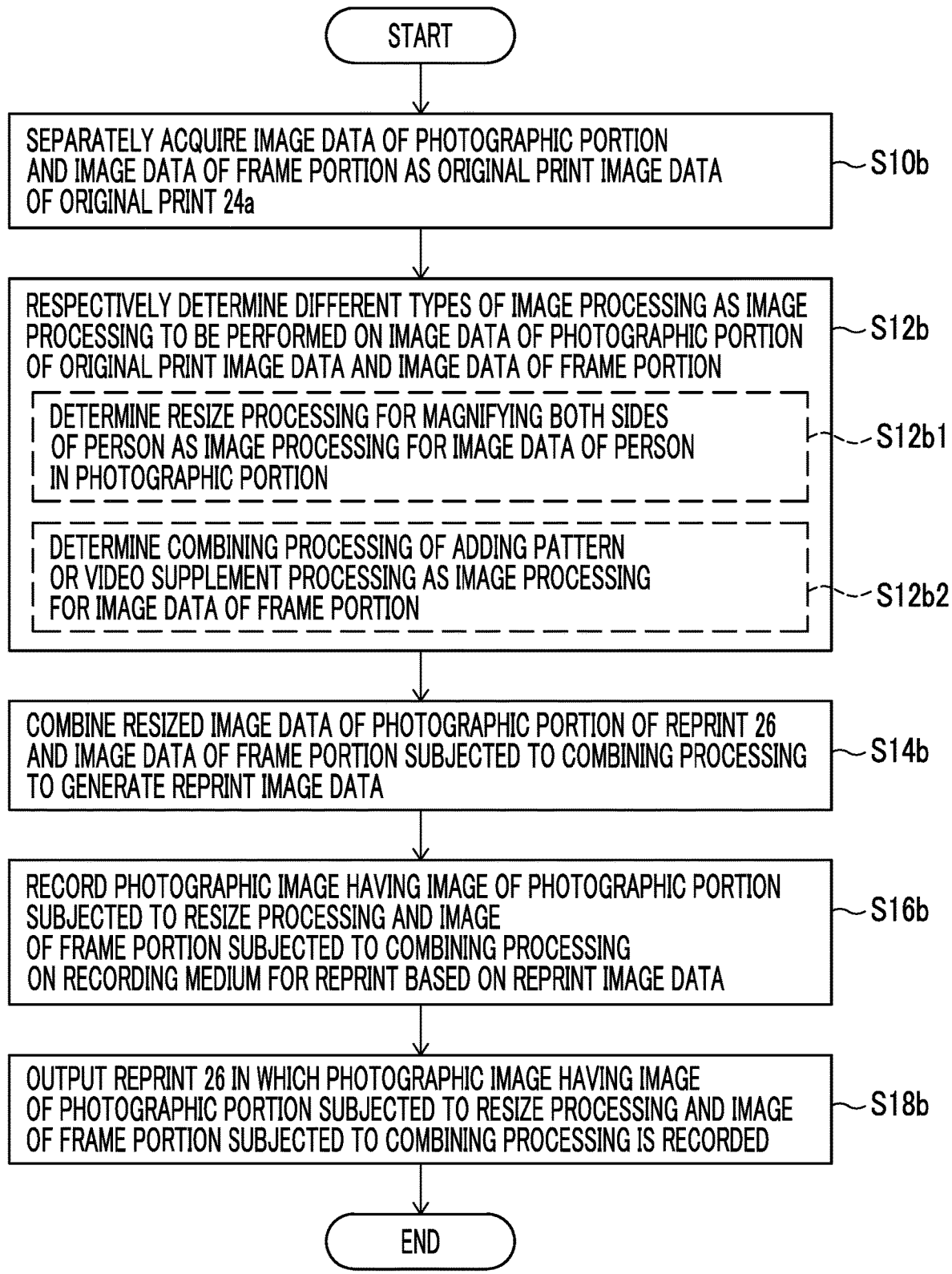
FIG. 5A is a flowchart of the second embodiment of the image processing method and the printing method shown in FIG. 5.

In the second embodiment as well, as shown on the left side of FIG. 5, an original (first) print 24a that is the same as the original print 24 shown in FIG. 4 of the first embodiment is prepared.

Here, as in the first embodiment, in the acquisition step S10 of the image processing method according to the embodiment of the present invention shown in FIG. 1, the image data of the original print 24a is acquired.

Here, as shown on the middle side of FIG. 5, the image of the photographic portion 25a of the scan image (image of the entire scanned original print 24a) that is the same as the image of the photographic portion 25a shown in FIG. 4 and the pattern image of the frame portion 25b are separated, and the image data of the photographic portion 25a and the image data of the pattern image of the frame portion 25b are respectively acquired. That is, as in step S10b shown in FIG. 5A, as the original print image data of the original print 24a, the image data of the photographic portion 25a and the image data of the frame portion 25b are separately acquired.

Then, in the determination step S12, different types of image processing, for example, resize processing, cropping processing, and a combining processing or a video supplement processing, are respectively determined for the image data of the photographic portion 25a and the image data of the pattern image of the frame portion 25b, which are acquired in the acquisition step S10. That is, as in step S12b of FIG. 5A, different types of image processing are respectively determined as the image processing to be performed on the image data of the photographic portion 25*a* of the original print image data and the image data of the frame portion 25*b*. Here, the image of the photographic portion 25*a* of the scan image and the pattern image of the frame portion 25*b* are not subjected to image scaling processing, that is, magnification/reduction processing.

For example, in a case in which the size of the recording medium 28 of a reprint 26*a* is different from the size of the original print 24*a* and is larger than the size of the original print 24*a*, the resize processing is performed on the image of the photographic portion 25*a* of the original print 24*a* according to the information on the size of the photographic portion 29*a* of the recording medium 28 of the reprint 26*a*. That is, as in step S12*b*1 of FIG. 5A, the resize processing for magnifying both sides of the person is determined as the image processing for the image data of the person in the photographic portion 25*a*. Along with this, this resize processing is not performed, and separately, it is necessary to perform the combining processing or the video supplement processing on the image of the frame portion 25*b* of the original print 24*a* according to the size of the frame portion 29*b* of the recording medium 28 of the reprint 26*a* to obtain the frame portion 27*b* of the reprint 26*a*. That is, as in step S12*b*2 of FIG. 5A, the combining processing of adding the pattern or the video supplement processing is determined as the image processing for the image data of the frame portion 25*b*. Accordingly, the frame portion 27*b* of the reprint 26*a* and the frame portion 25*b* of the original print 24*a* are different from each other.

For example, in a case in which the recording medium 28 of the original print 24*a* is the recording medium 28*a* shown in FIG. 3A, the recording medium 28 of the reprint 26*a* is the recording medium 28*c* shown in FIG. 3C, and the size thereof is large, the image of the photographic portion 25*a* of the original print 24*a* is subjected to the resize processing as in a fourth embodiment and a fifth embodiment, which will be described below, as the image processing, and the image of the photographic portion 27*a* of the reprint 26*a* is matched to the size of the photographic portion 29*a* of the recording medium 28*c*. That is, although details will be described below, this resize processing is image processing of, in a case in which the image of the photographic portion 25*a* of the original print 24*a* is the image obtained by trimming the original image (not shown) (hereinafter, also referred to as a raw image), performing the resize processing of returning the image to the raw image and trimming the raw image according to the size of the photographic portion 29*a* of the recording medium 28*c* to generate the image data to be the image of the photographic portion 27*a* of the reprint 26*a* without magnifying or reducing the image.

In a case of the image of the photographic portion 27*a* of the reprint 26*a* shown on the right side of FIG. 5, only two persons are shown in the raw image, and the background is shown on both sides thereof.

On the other hand, for the pattern image of the frame portion 27*b* of the reprint 26*a*, the image processing of the pattern image of the frame portion 25*b* of the original print 24*a* is the image processing of performing bleed processing of the pattern image of the frame portion 25*b* of the original print 24*a* according to the size of the frame portion 29*b* of the recording medium 28*c*, that is, the combining processing or the image supplement processing, to generate the image data to be the image of the frame portion 27*b* of the reprint 26*a* without magnifying or reducing the image.

As shown in the reprint 26*a* on the right side of FIG. 5, since the magnification/reduction processing is not performed on the scan image of the original print 24*a*, it is represented that the pattern image of the frame portion 25*b* of the original print 24*a* and the handwritten text "Happy b-day" are kept alive as they are, as in the first embodiment, and the pattern image is added or supplemented and combined to left and right regions 27*b*1, 27*b*2, 27*b*3, and 27*b*4 of the frame portion 27*b* corresponding to the image regions on both the left and right sides of two persons in the image of the photographic portion 27*a* of which the size is increased by the resize processing.

Then, in the generation step S14, the resize processing is performed on the image data of the photographic portion 25*a* of the original print 24*a* to generate the image data of the photographic portion 27*a* of the reprint 26*a*, the bleed processing of the pattern image is performed on the image of the pattern and the handwritten text of the frame portion 25*b* of the original print 24*a* to generate the image data of the frame portion 27*b* of the reprint 26*a*, and the image data of the photographic portion 27*a* and the image data of the frame portion 27*b* are combined to generate the reprint image data of the image of the reprint 26*a*. That is, as in step S14*b* of FIG. 5A, the resized image data of the photographic portion 27*a* of the reprint 26 and the image data of the frame portion 27*b* subjected to the combining processing are combined to generate the reprint image data.

In this way, the image processing method according to the embodiment of the present invention is terminated.

Thereafter, the recording step S16 and the output step S18 of the printing method according to the embodiment of the present invention shown in FIG. 1 are executed based on the reprint image data generated in the image processing method according to the embodiment of the present invention, the photographic image subjected to the resize processing is printed on the photographic portion 27*a* as shown on the right side of FIG. 5, and the reprint 26 is output on which the image, which is subjected to the bleed processing, of the pattern and the handwritten text is printed to the frame portion 27*b*. That is, as in step S16*b* of FIG. 5A, the photographic image having the image of the photographic portion 27*a* subjected to the resize processing and the image of the frame portion 27*b* subjected to the combining processing is recorded on the recording medium 28 for the reprint based on the reprint image data. Subsequently, as in step S18*b* of FIG. 5A, the reprint 26 is output in which the photographic image having the image of the photographic portion 27*a* subjected to the resize processing and the image of the frame portion 27*b* subjected to the combining processing is recorded.

It should be noted that, in the second embodiment, the recording medium 28 for the reprint 26 needs to be able to print the frame portion 29*b* similar to the photographic portion 29*a*.

In the second embodiment, in a case of reprinting to produce the reprint 26, the photographic portion 25*a* and the frame portion 25*b* of the original print 24 are separated, and different types of image processing are respectively performed on the respective image data to generate the image of the photographic portion 27*a* and the image of the frame portion 27*b* of the reprint 26, so that the reprint 26 having any size can be output and the optimum image can be obtained while keeping the features of the photographic portion 25*a* and the frame portion 25*b* of the original print 24 alive without magnifying or reducing the image.

In addition, in the second embodiment, a reprint image for outputting the reprint 26*a* is generated based on a result of the image processing of the frame portion 25*b* of the original print 24*a*. Accordingly, in a case in which the conditions, such as the size of the print paper (recording medium 28), are different between the original print 24a and the reprint 26a, the optimum image for the reprint 26a can be generated.

In addition, in a case in which the paper sizes of an original print 24b and a reprint 26b (recording medium 28) are different from each other, after the frame portion 27b of the reprint 26b is subjected to the bleed processing or the cropping processing without resizing, the photographic portion 27a is subjected to the resize processing and then combined, so that it is possible to generate an image suitable for the reprint 26b while preventing distortion of the handwritten text.

About Third Embodiment

First, a third embodiment of the image processing method and the printing method according to the embodiment of the present invention will be described in detail with reference to FIGS. 1, 6, and 6A.

In the third embodiment as well, as shown on the left side of FIG. 6, the original print 24b is prepared in which the photographic image of two persons is recorded on the photographic portion 25a and a pattern image different from that in FIG. 4 is recorded on the entire region of the frame portion 25b that surrounds the periphery of the photographic portion 25a, as in the original print 24 shown in FIG. 4.

In addition, the reprint paper (recording medium) 28c on which the image of the reprint 26b is recorded is also prepared. In the example shown in FIG. 6, the size of the recording medium 28c is larger than the size of the original print 24b.

In this case, in the acquisition step S10 of the image processing method according to the embodiment of the present invention shown in FIG. 1, the original print 24b is scanned to acquire the image data of the original print 24b.

Figure 6A:
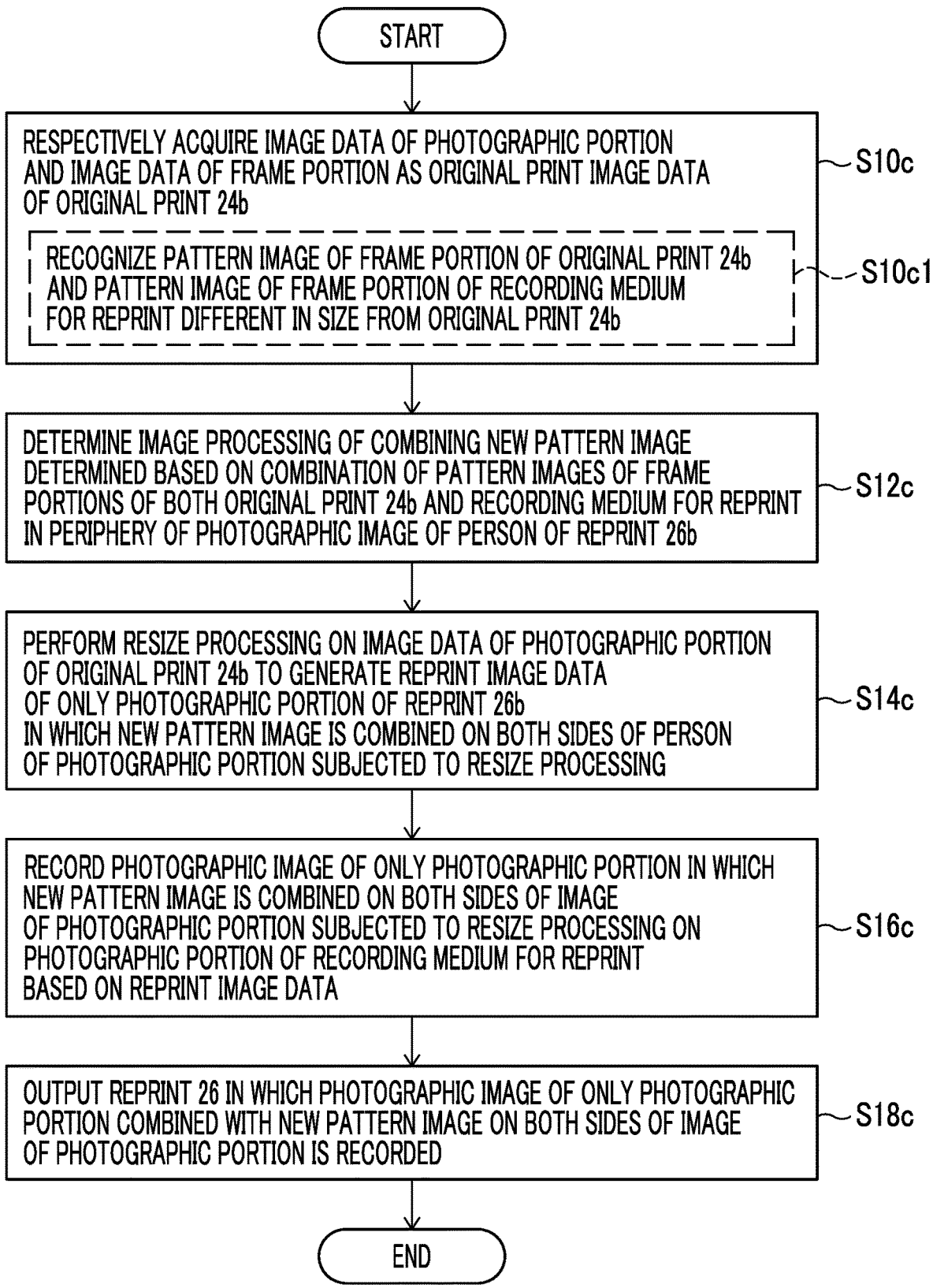
FIG. 6A is a flowchart of the third embodiment of the image processing method and the printing method shown in FIG. 6.

Here, as shown on the middle side of FIG. 6, the image data of the image of the photographic portion 25a of the scan image of the original print 24b is acquired. That is, as in step S10c shown in FIG. 6A, as the original print image data of the original print 24b, the image data of the photographic portion 25a and the image data of the frame portion 25b are respectively acquired.

In addition, a pattern image 25b1 of the frame portion 25b of the scan image of the original print 24b and a pattern image 29b1 of the frame portion 29b of the recording medium 28c for the reprint different in size from the original print 24b are recognized (step S10c1 of FIG. 6A).

Then, in the determination step S12, the pattern image 25b1 of the frame portion 25b of the scan image represented by the original print image data acquired in the acquisition step S10 and the pattern image 29b1 of the frame portion 29b of the recording medium 28c are recognized, a new pattern image to be combined in the photographic image of the reprint 26b is determined based on a combination of the two recognized pattern images 25b1 and 29b1, and the image processing of combining the determined pattern image in the periphery of the photographic image of two persons of the photographic portion 27a of the reprint 26b is determined (see step S12c of FIG. 6A).

It should be noted that, as shown on the middle side of FIG. 6, it is needless to say that a new pattern image 30 is determined to be combined in the periphery of the photographic image of two persons of a reprint image 32 serving as the photographic portion 27a of the reprint 26.

Here, the image processing determined in the determination step S12 is image processing of performing the resize processing of disposing the photographic image of the photographic portion 25a of the original print 24b as it is in the center of the photographic portion 29a of the recording medium 28c having a large size, and combining the determined new pattern image 30 in the periphery thereof to obtain the reprint image 32 of the reprint 26b. That is, the image of the photographic portion 27a of the reprint 26b before combining the new pattern image 30 can be said that the photographic image of the photographic portion 25a of the original print 24b is subjected to the resize processing in the same manner as the image of the photographic portion 27a of the reprint 26a according to the second embodiment.

It should be noted that the photographic image of the photographic portion 25a of the original print 24b disposed in the center of the photographic portion 29a of the recording medium 28c having a large size may be subjected to some magnification/reduction processing as long as the new pattern image 30 can be combined in the periphery thereof.

Then, in the generation step S14, the resize processing is performed on the image data of the image of the photographic portion 25a of the original print 24b, and then the new pattern image 30 is combined in the periphery of the image of the photographic portion 25a to generate the reprint image data for recording the reprint image 32 of the photographic portion 27a of the reprint 26b. That is, as in step S14c shown in FIG. 6A, the resize processing is performed on the image data of the photographic portion 25a of the original print 24b to generate the reprint image data of only the photographic portion 27a of the reprint 26b in which the new pattern image is combined on both sides of the person of the photographic portion 25a subjected to the resize processing. It should be noted that the reprint image data does not include the image data of the frame portion 27b of the reprint 26b.

In this way, the image processing method according to the embodiment of the present invention is terminated.

Thereafter, the recording step S16 and the output step S18 of the printing method according to the embodiment of the present invention shown in FIG. 1 are executed based on the reprint image data generated in the image processing method according to the embodiment of the present invention, and as shown on the middle side of FIG. 6, the reprint 26b serving as the photographic portion 27a in which the reprint image 32 is recorded on the first region (photographic portion) 29a of the recording medium 28c is output. That is, as in step S16c of FIG. 6A, the photographic image of only the photographic portion in which the new pattern image is combined on both sides of the image of the photographic portion subjected to the resize processing is recorded on the photographic portion of the recording medium for the reprint based on the reprint image data. Subsequently, as in step S18c of FIG. 6A, the reprint 26 is output in which the photographic image of only the photographic portion combined with the new pattern image on both sides of the image of the photographic portion is recorded.

It should be noted that, in the third embodiment, the frame portion 27b of the reprint 26b is the frame portion 29b of the recording medium 28c.

In the third embodiment, in a case of reprinting to produce the reprint 26b, since the new pattern image 30, which is determined based on the combination of the original print 24b, the pattern images of both the frame portions 25b and 29b of the reprint paper (recording medium) 28, is combined in the periphery of the photographic portion 25a of the printed original print 24b, it is possible to obtain the optimum image.

That is, in a case in which the paper sizes of the original print 24b and the reprint 26b (recording medium 28) are different from each other, the whole image can be harmonized while filling the gap in the reprint 26 by combining the new pattern image 30 (frame), which matches the recognized pattern image of the frame portion 25*b* of the original print 24*b* and the pattern image of the frame portion 27*b* (frame portion 29*b* of the recording medium 28*c*) of the reprint 26*b*, and the image of the photographic portion 25*a* of the original print 24*b*.

In the first to third embodiments described above, since the reprint image is processed based on the pattern of the frame portion 25*b* of the original print 24 (24*a*, 24*b*), the handwritten text, the pattern of the frame portion 27*b* (29*b*) of the reprint 26 (26*a*, 26*b*) or based on a combination thereof, the information on the frame portions 25*b* and 27*b* (29*b*) can be used, and since different types of processing can be performed on the photographic portions 25*a* and 27*a* (29*a*), and the frame portions 25*b* and 27*b* (29*b*), the reprint image can be made to the optimum image for the reprint 26 (26*a*, 26*b*).

About Fourth Embodiment

First, a fourth embodiment of the image processing method and the printing method according to the embodiment of the present invention will be described in detail with reference to FIGS. 1, 7, and 7A.

Figure 7:
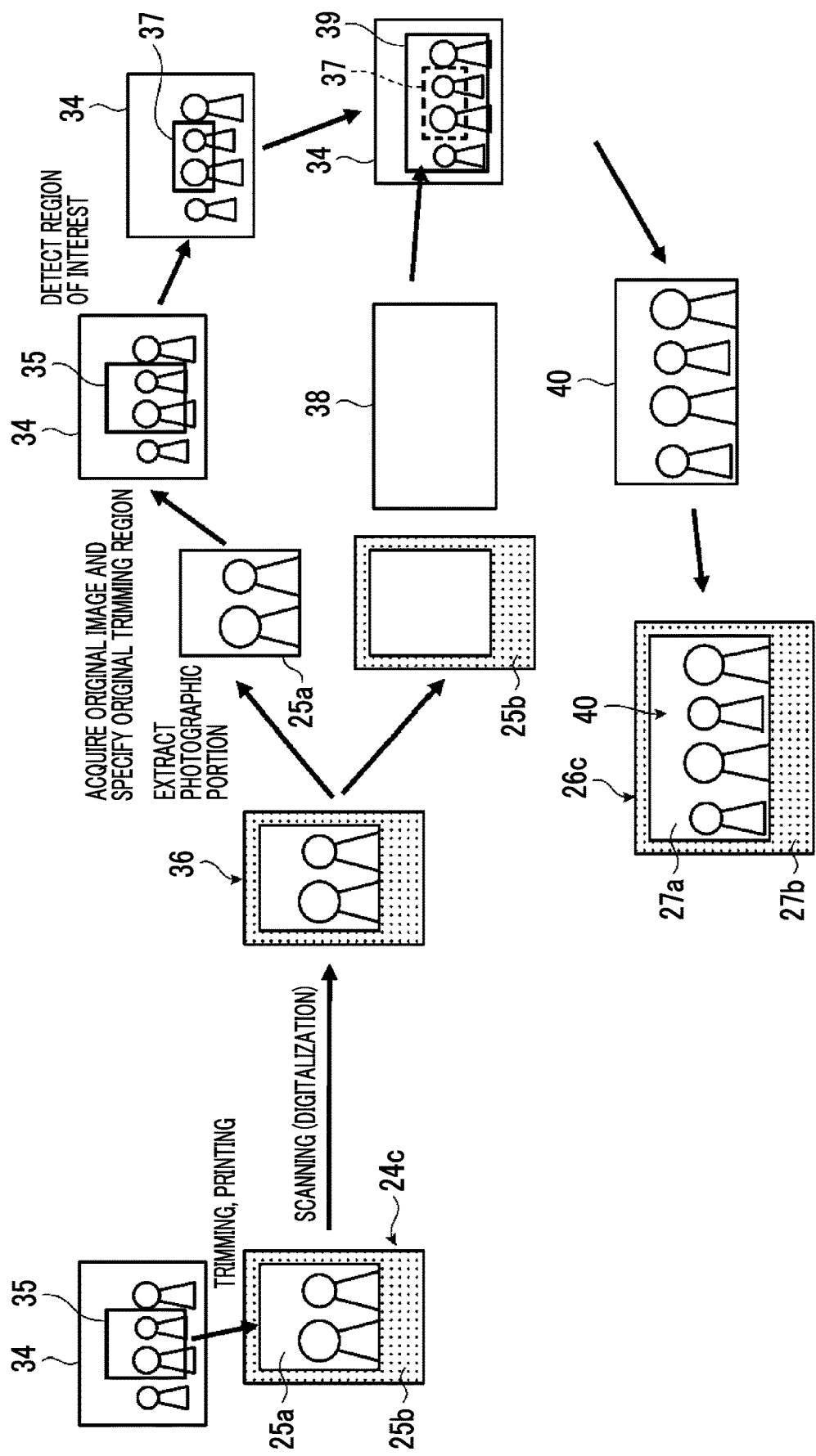
FIG. 7 is a diagram for describing a fourth embodiment of the image processing method and the printing method according to the embodiment of the present invention.

In the fourth embodiment, as shown on the left side of FIG. 7, an original print 24*c* is obtained by trimming an original image (raw image) 34, that is, printing an image in an original trimming region 35 including two persons on an inner side among four persons of the original image 34 as the photographic image of the photographic portion 25*a*.

In this case, in the acquisition step S10 of the image processing method according to the embodiment of the present invention shown in FIG. 1, the original print 24*c* is scanned to acquire (digital) image data of the original print 24*c*. This image data represents an image obtained by scanning the original print 24*c*, that is, a scan image 36.

Here, as shown in the upper middle side of FIG. 7, the image data of the scan image 36 of the original print 24*c* is separated into the image data of the image of the photographic portion 25*a* and the image data of the pattern image of the frame portion 25*b*. That is, as in step S10*d* shown in FIG. 7A, as the original print image data of the original print 24*c*, the image data of the photographic portion 25*a* and the image data of the frame portion 25*b* are respectively and separately acquired.

Then, in the determination step S12, the image processing to be applied to the image data acquired in the acquisition step S10 is determined (see S12*d* in FIG. 7A).

As the image processing determined in the determination step S12, first, there is image processing 1 of, as shown in the upper middle side of FIG. 7, determining the original image 34 from the image data of the image of the photographic portion 25*a* of the original print 24*c*, acquiring the image data of the original image 34, and specifying the original trimming region 35 of the original image 34 to be the image of the photographic portion 25*a* of the original print 24*c* from the original image 34 (see S12*d*1 of FIG. 7A). Here, the acquisition of the original image 34 and the specification of the original trimming region 35 can be performed by using, for example, a quick response (QR) code (registered trademark) of the original print 24*c* and various markers.

In addition, this image processing includes image processing 2 of, as shown on the upper right side of FIG. 7, specifying a region including faces of two persons included in the image in the original trimming region 35 as a region of interest 37 (see S12*d*2 in FIG. 7A).

Further, this image processing includes image processing 3 of acquiring reprint size information 38, which is the size of the photographic portion 29*a* of the recording medium 28 for recording the image to be a reprint 26*c*, as shown on the middle side of FIG. 7, determining and setting a reprint trimming region 39 including the region of interest 37 of the original image 34 based on the original trimming region 35, the region of interest 37, and the reprint size information 38 as shown on the right side of FIG. 7, and determining the image in the reprint trimming region 39 of the original image 34 as a reprint image 40 as shown on the lower right side of FIG. 7 to generate the reprint image data of the reprint image 40 from the image data of the original image 34 (see S12*d*3 in FIG. 7A).

Then, in the generation step S14, the above-described image processing (image processing 1, 2, and 3) is performed on the image data of the photographic portion 25*a* of the original print 24*b* to generate the reprint image data of the reprint image 40 (see S14*d* of FIG. 7A).

In the generation step S14, first, the image processing 1 is performed, the original image 34 is determined, the image data of the original image 34 is acquired, and the original trimming region 35 of the original image 34 is specified (see S14*d*1 of FIG. 7A).

Then, the image processing 2 is performed to specify the region of interest 37 (see S14*d*2 of FIG. 7A), and then the image processing 3 is performed to acquire the reprint size information 38, to set the reprint trimming region 39 including the region of interest 37 of the original image 34, to determine the reprint image 40 in the reprint trimming region 39, and to generate the reprint image data of the reprint image 40 from the image data of the original image 34 (see S14*d*3 in FIG. 7A).

In this way, the image processing method according to the embodiment of the present invention is terminated.

Thereafter, the recording step S16 and the output step S18 of the printing method according to the embodiment of the present invention shown in FIG. 1 are executed based on the reprint image data generated in the image processing method according to the embodiment of the present invention, and as shown on the lower middle side of FIG. 7, the reprint 26*c* is output in which the reprint image 40 is recorded on the photographic portion 27*a* of which the periphery is surrounded by the frame portion 27*b*. That is, as in step S16*d* of FIG. 7A, the reprint image is recorded on the photographic portion of the recording medium for the reprint based on the reprint image data. Subsequently, as in step S18*d* of FIG. 7A, the reprint 26 is output in which the reprint image is recorded on the photographic portion 27*a*.

It should be noted that, in the fourth embodiment, no new image is recorded on the frame portion 27*b* of the reprint 26*c*, the recording medium 28, for example, the frame portion 29*b* of the recording medium 28*c* remains as it is. However, as in the first embodiment and the second embodiment, the image, the text, and the like may be recorded on the frame portion 29*b* of the recording medium 28.

In the fourth embodiment, since the original image 34 of the original print 24*c* is acquired based on the image of the photographic portion 25*a* of the original print 24*c*, and the reprint 26*c* having the reprint image 40 based on the original image 34 in the photographic portion 27*a* is output, it is possible to make the reprint image 40 to be the optimum image for the reprint 26*c* in which a new image is added to the image of the original print 24*c*.

In addition, it is possible to generate the reprint image suitable for the reprint 26c by using the trimming region (cropping region) optimized for the paper size of the reprint 26c instead of the trimming region (cropping region) that reflects the limitation of the paper size of the original print 24c.

It should be noted that trimming is performed based on the zoom magnification and the degree of interest of the subject in JP2007-258869A, but the fourth embodiment is different in that the reprint trimming region is determined by further using the trimming region of the original print designated for a size different from the original image as hint information.

By the way, in the present fourth embodiment as well, the image processing method according to the first to third embodiments may be additionally performed.

About Fifth Embodiment

First, a fifth embodiment of the image processing method and the printing method according to the embodiment of the present invention will be described in detail with reference to FIGS. 1, 8, and 8A.

The fifth embodiment is different from the fourth embodiment shown in FIG. 7 in that, as shown on the right middle side of FIG. 8, the person and/or a scene 42 in the image of the photographic portion 25a of the original print 24c extracted from the scan image of the original print 24c is recognized, and the recognition result is added to determine the reprint trimming region 39 in the image processing 3, but the fifth embodiment is the same as the fourth embodiment in other respects. For this reason, the detailed description of the portions that are the same as the portions in the fourth embodiment will be omitted, and the differences will be mainly described.

That is, in the fifth embodiment, the acquisition step S10 of the image processing method according to the embodiment of the present invention shown in FIG. 1 is performed in the same manner as in the fourth embodiment. That is, as shown in FIG. 8A, step S10e that is the same as step S10d shown in FIG. 7A is executed.

Then, in the determination step S12, the image processing to be applied to the image data acquired in the acquisition step S10 is determined.

Among the types of image processing determined in the determination step S12, the image processing 1 of specifying the original trimming region 35 of the original image 34 and the image processing 2 of specifying the region of interest 37 are the same as the image processing 1 and the image processing 2 in the fourth embodiment. That is, as in step S12e shown in FIG. 8A, step S12e1 and step S12e2 that are the same as step S12d1 and step S12d2 in step S12d shown in FIG. 7A are executed.

However, processing of determining the reprint trimming region 39 in the image processing 3 in the fourth embodiment of determining and setting the reprint trimming region 39 and determining the reprint image 40 to generate the reprint image data is different from the image processing 3 in the fourth embodiment. That is, although the image processing in the fifth embodiment is similar to the image processing 3 in the fourth embodiment, the image processing is image processing 4 including new image processing of further recognizing the person and/or the scene 42 in the image of the photographic portion 25a of the original print 24c as shown on the right middle side of FIG. 8, further adding the recognition result to the original trimming region 35, the region of interest 37, and the reprint size information 38 as shown on the right side of FIG. 8, and determining and setting the reprint trimming region 39 including the region of interest 37 of the original image 34 based on these pieces of information.

Figure 8A:
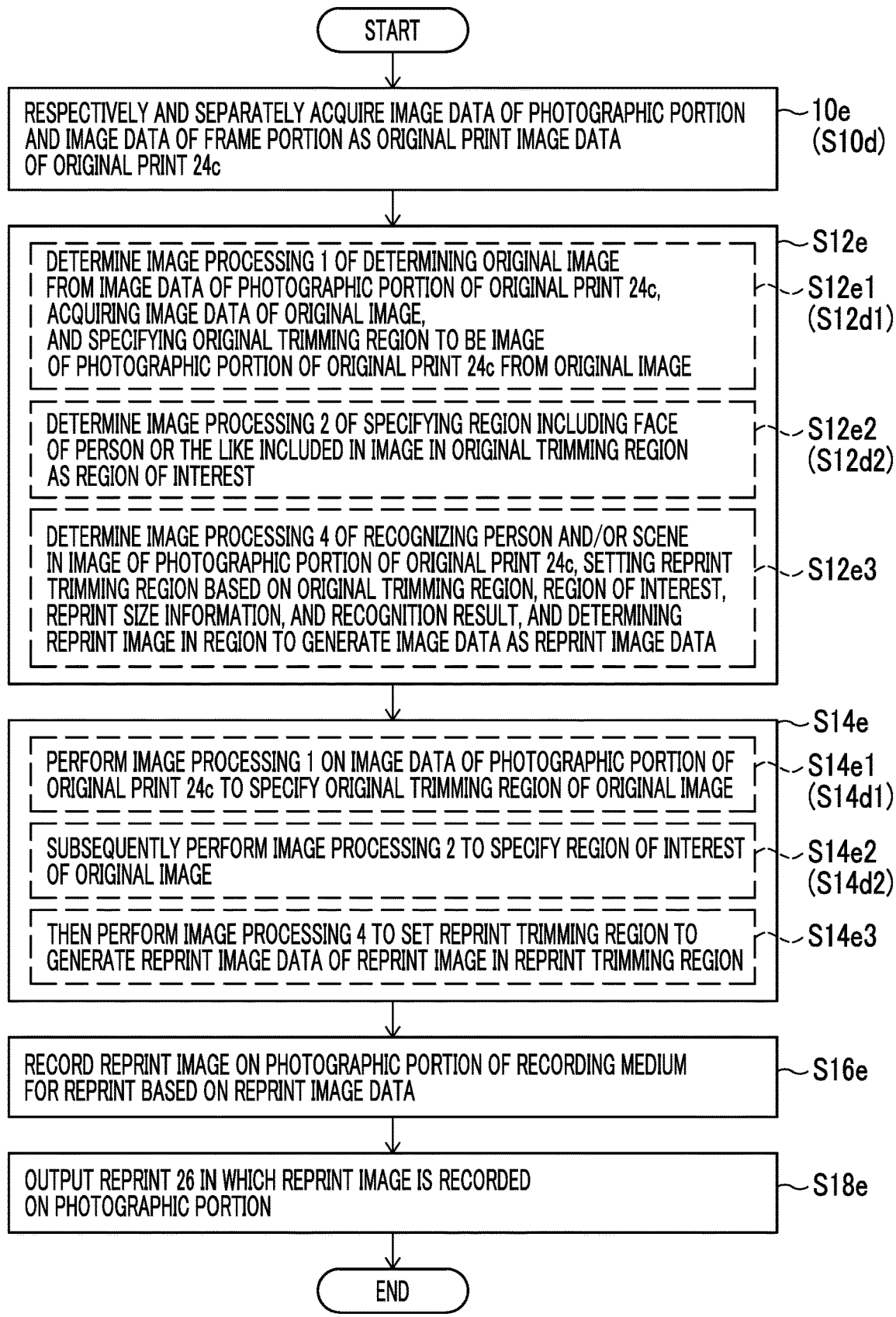
FIG. 8A is a flowchart of the fifth embodiment of the image processing method and the printing method shown in FIG. 8.

The image processing 4 in the fifth embodiment as well is the same as the image processing 3 in the fourth embodiment in that, after the reprint trimming region 39 is determined, the image in the reprint trimming region 39 of the original image 34 is determined as the reprint image 40 to generate the reprint image data of the reprint image 40 from the image data of the original image 34 as shown on the lower right side of FIG. 8. That is, as in step S12e3 shown in FIG. 8A, the image processing 4 of recognizing the person and/or the scene in the image of the photographic portion of the original print 24c, setting the reprint trimming region 39 based on the original trimming region 35, the region of interest 37, the reprint size information 38, and the recognition result, and determining the reprint image 40 in the region to generate the image data as the reprint image data is determined.

It should be noted that, in the fifth embodiment, in a case of specifying the region of interest 37 as the image processing 2, the region of interest 37 may be determined according to any one or more of the recognized scene or person. For example, the region of interest 37 may be determined to include a family member of the person included in the original print 24c and/or a person having a friendship relationship. In addition, the region of interest 37 may be determined to include an important and/or symbolic subject in the recognized scene.

Then, in the generation step S14, as in the fourth embodiment, the image processing 1 is performed, the original image 34 is determined, the image data of the original image 34 is acquired, the original trimming region 35 of the original image 34 is specified, and the image processing 2 is performed to specify the region of interest 37. That is, as in step S14e shown in FIG. 8A, step S14e1 of performing the image processing 1 and step S14e2 of performing the image processing 2, which are the same as step S14d1 and step S14d2 in step S14d shown in FIG. 7A, are executed.

Then, the image processing 4 is performed to acquire the reprint size information 38, to set the reprint trimming region 39 including the region of interest 37 of the original image 34, to determine the reprint image 40 in the reprint trimming region 39, and to generate the reprint image data of the reprint image 40 from the image data of the original image 34. That is, step S14e3 shown in FIG. 8A is executed.

In this way, the image processing method according to the embodiment of the present invention is terminated.

Thereafter, as in the fourth embodiment, the recording step S16 and the output step S18 of the printing method according to the embodiment of the present invention shown in FIG. 1 are executed based on the reprint image data generated in the image processing method according to the embodiment of the present invention, and as shown on the lower middle side of FIG. 7, the reprint 26c is output in which the reprint image 40 is recorded on the photographic portion 27a of which the periphery is surrounded by the frame portion 27b. That is, as in the step S16e of FIG. 8A, the reprint image is recorded on the photographic portion of the recording medium for the reprint based on the reprint image data, in the same manner as in the step S16d of FIG. 7A. Subsequently, as in step S18e of FIG. 8A, the reprint 26 is output in which the reprint image is recorded on the photographic portion 27a, in the same manner as in step S18d of FIG. 7A.

In the fifth embodiment, since the reprint trimming region 39 is determined by further adding the result of recognizing the person and/or the scene 42 in the image of the photographic portion 25a of the original print 24c, and the reprint 26c having the reprint image 40 in the photographic portion 27a is output, it is possible to make the reprint image 40 of the reprint 26c to be the optimum image in consideration of the person and/or the scene in the image of the original print 24c.

The first to fifth embodiments of the image processing method and the printing method according to the embodiment of the present invention are configured as described above.

In the present invention, an image to be printed on another printing region is generated based on the result of the image processing of the frame portion of the original print.

In addition, since the image to be printed on the other printing region (photographic portion) is generated based on the presence, the position, and the drawing content of the frame portion, in a case in which the image of the original print having the frame portion is scanned and printed on the other printing region, it is possible to obtain the optimal printing content even for the printing regions having the same or different aspect ratios.

Although the image processing method and the printing method according to the embodiment of the present invention are described in detail above, the present invention is not limited to the embodiments described above, and it is needless to say that various improvements and changes may be made without departing from the gist of the present invention.

EXPLANATION OF REFERENCES

10: print output system
12: smart device
14: computer
16: server
18: printer
20: network
22: printer-equipped analog camera
24, 24a, 24b, 24c: first print (original print)
25a, 29a: first region (photographic portion)
25b, 29b: second region (frame portion)
25b1, 29b1, 30: pattern image
26, 26a, 26b, 26c: second print (reprint)
27a, 27c: third region (photographic portion)
27b: fourth region (frame portion)
27b1, 27b2, 27b3, 27b4: region
28, 28a, 28b, 28c: recording medium (print paper)
32: reprint image
34: original image (raw image)
35: original trimming region
36: scan image
37: region of interest
38: reprint size information
39: reprint trimming region
40: reprint image
42: person and/or scene
50: image processing device
52: processor
54: memory
56: storage
58: communication interface
60: input device
62: display (display device)
S10: acquisition step of first print image data
S10a, S10a1, S10b, S10c, S10c1, S10d, S10e: (acquisition) step
S12: determination step of image processing to be applied
S12a, S12b, S12b1, S12b2, S12c, S12d, S12d1, S12d2, S12d3, S12e, S12e1, S12e2, S12e3: (determination) step
S14: generation step of second print image data
S14a, S14b, S14c, S14d, S14d1, S14d2, S14d3, S14e, S14e1, S14e2, S14e3: (generation) step
S16: recording step of second print image
S16a, S16b, S16c, S16d, S16e: (recording) step
S18: output step of second print
S18a, S18b, S18c, S18d, S18e: (output) step

What is claimed is:

1. An image processing method comprising:
an acquisition step of acquiring first print image data from a first print having a first region and a second region;
a determination step of determining image processing to be applied, based on information acquired from at least one region of the first region or the second region; and
a generation step of generating second print image data for outputting a second print having a third region corresponding to the first region by performing the image processing on the acquired first print image data,
wherein the second print has a fourth region corresponding to the second region, and
wherein the acquisition step includes a detection step of detecting first region image data of the first region of the first print and second region image data of the second region of the first print,
in the determination step, different types of image processing are respectively determined for the first region image data and the second region image data, which are detected, and
in the generation step, third region image data of the third region and fourth region image data of the fourth region are generated based on the first region image data and the second region image data, and are combined as the second print image data.

2. The image processing method according to claim 1, wherein, in a case in which a paper size of the first print and a recording medium size of the second print are different from each other, in the generation step,
the fourth region image data of the second print is generated by performing, on the second region image data of the first print, image processing for supplementing or cropping a video without resizing the second region of the first print,
the third region image data of the second print is generated by performing, on the first region image data of the first print, image processing for resizing the first region of the first print based on information on a size of the fourth region of the second print, and
the second print image data is generated by combining the fourth region image data of the second print and the third region image data of the second print.

3. A printing method comprising:
outputting, based on the second print image data generated by the image processing method according to claim 2, the second print in which an image for the second print is recorded on a recording medium of the second print.

4. The image processing method according to claim 1, wherein the information acquired from the at least one region includes a result of the image processing on the first print image data in the at least one region.

5. A printing method comprising:
outputting, based on the second print image data generated by the image processing method according to claim 1, the second print in which an image for the second print is recorded on a recording medium of the second print.

6. An image processing method comprising:

an acquisition step of acquiring first print image data from a first print having a first region and a second region;

a determination step of determining image processing to be applied, based on information acquired from at least one region of the first region or the second region; and a generation step of generating second print image data for outputting a second print having a third region corresponding to the first region by performing the image processing on the acquired first print image data, wherein the second print has a fourth region corresponding to the second region, and wherein the first region and the third region are photographic portions of the first print and the second print, respectively, and the second region and the fourth region are frame portions of the first print and the second print, respectively.

7. The image processing method according to claim 6, wherein, in the generation step, the second print image data is generated by recognizing a pattern and a handwritten text of the frame portion of the first print, and applying image processing according to a recognition result to the first print image data of the photographic portion of the first print.

8. A printing method comprising:

outputting, based on the second print image data generated by the image processing method according to claim 7, the second print in which an image for the second print is recorded on a recording medium of the second print.

9. The image processing method according to claim 6, wherein, in the generation step, the second print image data is generated by applying image processing according to a combination of a pattern of the frame portion of the first print and a pattern of the frame portion of a recording medium used in the second print to the first print image data of the photographic portion of the first print.

10. A printing method comprising:

outputting, based on the second print image data generated by the image processing method according to claim 9, the second print in which an image for the second print is recorded on a recording medium of the second print.

11. The image processing method according to claim 6, wherein the frame portion of the second print is different from the frame portion of the first print.

12. The image processing method according to claim 6, wherein, in the generation step, as a cropping region of an image for the second print, information on a new cropping region for generating the image for the second print is generated based on a first image corresponding to the photographic portion of the first print, cropping region information for the first image, and recording medium size information of the second print.

13. A printing method comprising:

outputting, based on the second print image data generated by the image processing method according to claim 6, the second print in which an image for the second print is recorded on a recording medium of the second print.

14. The image processing method according to claim 6, wherein the information acquired from the at least one region includes a result of the image processing on the first print image data in the at least one region.

15. An image processing device comprising:

a smart device that acquires first print image data from a first print having a first region and a second region;

a processor that determines image processing to be applied, based on information acquired from at least one region of the first region or the second region, and performs the determined image processing on the acquired first print image data to generate second print image data for outputting a second print having a third region corresponding to the first region; and a network that transmits the first print image data acquired in the smart device to the processor, wherein the smart device detects first region image data of the first region of the first print and second region image data of the second region of the first print, and the processor respectively determines different types of image processing for the first region image data and the second region image data, which are detected, generates third region image data of the third region and fourth region image data of a fourth region corresponding to the second region based on the first region image data and the second region image data, and combines the third region image data and the fourth region image data as the second print image data.

16. A print output system comprising:

the image processing device according to claim 15; and a printer that outputs, based on the second print image data generated by the image processing device, the second print in which an image for the second print is recorded on a recording medium of the second print.

17. The image processing device according to claim 15, wherein the first region and the third region are photographic portions of the first print and the second print, respectively, and the second region and the fourth region are frame portions of the first print and the second print, respectively.

18. The image processing device according to claim 17, wherein the processor generates the second print image data by recognizing a pattern and a handwritten text of the frame portion of the first print, and applying image processing according to a recognition result to the first print image data of the photographic portion of the first print.

19. The image processing device according to claim 17, wherein the processor generates the second print image data by applying image processing according to a combination of a pattern of the frame portion of the first print and a pattern of the frame portion of a recording medium used in the second print to the first print image data of the photographic portion of the first print.

20. The image processing device according to claim 17, wherein the frame portion of the second print is different from the frame portion of the first print.

* * * * *